United States Patent
Nakajima et al.

(10) Patent No.: US 7,854,508 B2
(45) Date of Patent: Dec. 21, 2010

(54) PLASTIC LENS AND MANUFACTURING METHOD OF PLASTIC LENS

(75) Inventors: Mikito Nakajima, Ina (JP); Katsuyoshi Takeshita, Minowamachi (JP); Yusuke Kutsukake, Minowa-machi (JP); Jun Kinoshita, Ina (JP); Shuji Naito, Minowamachi (JP); Koichi Takahama, Kadoma (JP); Hiroshi Yokogawa, Kadoma (JP); Takeyuki Yamaki, Kadoma (JP); Akira Tsujimoto, Kadoma (JP); Ryozo Fukuzaki, Kadoma (JP)

(73) Assignees: Seiko Epson Corporation, Tokyo (JP); Panasonic Electric Works Co., Ltd., Osaka (JP)

( * ) Notice: Subject to any disclaimer, the term of this patent is extended or adjusted under 35 U.S.C. 154(b) by 177 days.

(21) Appl. No.: 12/089,519

(22) PCT Filed: Sep. 15, 2006

(86) PCT No.: PCT/JP2006/318806

§ 371 (c)(1),
(2), (4) Date: Apr. 7, 2008

(87) PCT Pub. No.: WO2007/043301

PCT Pub. Date: Apr. 19, 2007

(65) Prior Publication Data

US 2009/0040457 A1     Feb. 12, 2009

(30) Foreign Application Priority Data

Oct. 7, 2005   (JP) ............................. 2005-295085

(51) Int. Cl.
- G02C 7/02   (2006.01)
- B29D 11/00  (2006.01)
- C03C 17/00  (2006.01)

(52) U.S. Cl. ................. 351/166; 351/177; 264/1.7; 65/60.52; 65/60.8

(58) Field of Classification Search ............... 351/166, 351/177

See application file for complete search history.

(56) References Cited

U.S. PATENT DOCUMENTS

| | | | |
|---|---|---|---|
| 6,958,191 | B2 | 10/2005 | Yamaguchi et al. |
| 7,226,982 | B2 | 6/2007 | Yamaya et al. |
| 2004/0209084 | A1* | 10/2004 | Yamaya et al. ............. 428/421 |
| 2005/0041298 | A1* | 2/2005 | Toda et al. ................. 359/642 |
| 2006/0078723 | A1* | 4/2006 | Kutsukake et al. ....... 428/304.4 |
| 2006/0128836 | A1 | 6/2006 | Honda et al. |
| 2006/0251884 | A1* | 11/2006 | Naito et al. ................ 428/331 |

FOREIGN PATENT DOCUMENTS

| | | |
|---|---|---|
| EP | 1 471 120 A2 | 10/2004 |
| EP | 1 566 666 A1 | 8/2005 |
| JP | 06-029332 A | 4/1994 |
| JP | 2629813 B2 | 4/1997 |
| JP | 11-310755 A | 11/1999 |
| JP | 2000-204301 A | 7/2000 |
| JP | 2000-284235 A | 10/2000 |
| JP | 2002-053805 A | 2/2002 |
| JP | 2003-195003 A | 7/2003 |
| JP | 2003-222703 A | 8/2003 |
| JP | 2004-145283 A | 5/2004 |
| JP | 2004-169018 A | 6/2004 |
| JP | 2004-315712 A | 11/2004 |
| JP | 2005-010618 A | 1/2005 |

* cited by examiner

*Primary Examiner*—Jordan M. Schwartz
(74) *Attorney, Agent, or Firm*—Sughrue Mion, PLLC

(57) ABSTRACT

A plastic lens includes: a plastic lens base material; a hard coat layer formed on the plastic lens base material; an organic antireflection film formed on the hard coat layer; and a primer layer between the plastic lens base material and the hard coat layer. The plastic lens base material contains at least a sulfur atom. The hard coat layer contains at least: fine metal oxide particles containing a titanium oxide having a rutile-type crystalline structure; and an organosilicon compound represented by a general formula of $R^1 SiX^1_3$. The antireflection film contains a coating composition containing at least: an organosilicon compound represented by a general formula of $X_m R^2_{3-m} Si-Y-SiR^2_{3-m} X_m$; an epoxy group-containing organic compound containing one or more epoxy group in a molecule; and fine silica particles with average particle size of 1 to 150 nm, the antireflection film having a refractive index lower than that of the hard coat layer by 0.10 or more.

7 Claims, No Drawings

PLASTIC LENS AND MANUFACTURING METHOD OF PLASTIC LENS

TECHNICAL FIELD

The present invention is related to a plastic lens and a manufacturing method of the plastic lens.

BACKGROUND ART

A plastic lens is lighter in mass and superior in moldability, processability, dye-affinity and the like as well as being less likely to break to provide superior safety as compared to a glass lens, so that the plastic lens has been rapidly becoming popular in an eye-glass field and accounts for largest share. In addition, there have been developed high-index materials such as a thiourethane resin and an episulfide resin in response to demands for thinner and lighter lenses. Meanwhile, since the plastic lens more likely gets scratches than the glass lens, a hard coat layer is typically formed on a surface of the plastic lens to enhance its surface hardness. In addition, an antireflection film is formed by vapor-depositing an inorganic substance on an upper surface of the hard coat layer in order to prevent surface reflection, and a stainproof layer formed of a fluorine-containing organosilicon compound is formed on an upper surface of the antireflection film in order to enhance water/oil repellency of the surface of the antireflection film. As described above, the plastic lens has been being improved as a high-performance lens owing to technological innovation of surface treatment.

However, the plastic lens has a drawback with its low thermal resistance. Furthermore, due to use of a resin material with higher refractive index for the plastic lens, the thermal resistance of the plastic lens tends to be degraded Especially, the inorganic antireflection film in surface coating layers cannot follow thermal expansion deformation of the plastic lens as a base material, resulting in causing cloud or cracks, and this drawback is more significant in a plastic lens with higher refractive index.

Since the inorganic antireflection film is formed by vacuum deposition, the inorganic antireflection film typically has high film density and has a performance for blocking factors that degrades durability of the plastic lens (e.g., oxygen, moisture, ultraviolet light, etc.) from contacting the hard coat layer as a lower layer from outside of the lens, namely the inorganic antireflection film has a protection effect. With such inorganic antireflection film, even when the hard coat layer as the lower layer is formed using a coating composition containing as the main component a titanium oxide having an anatase type crystalline structure that has low light resistance, the durability of the plastic lens can be ensured to some extent. On the other hand, since the antireflection film formed of an organic film has relatively lower film density than the inorganic antireflection film, which has a structure with voids, the protection effect as that of the inorganic antireflection film cannot be provided. Accordingly, when the hard coat layer is formed using the coating composition containing as a main component the titanium oxide having the anatase type crystalline structure, the durability of the plastic lens is not sufficient, so that the hard coat layer as the lower layer requires higher durability.

In order to satisfy such requirement, there has been proposed a technology to form a hard coat layer using a coating composition containing fine metal oxide particles that contain as a main component a titanium oxide having a rutile type crystalline structure (see, for instance, Document 1: JP-A-11-310755). Since the hard coat layer uses the titanium oxide with low photoactivation effect, it can realize enhanced durability and higher refractive index as compared to the related-art titanium oxide with the anatase type crystalline structure.

Further, since the antireflection film formed of the organic film has relatively lower film density than the inorganic antireflection film as described above and has a structure with voids, scratch resistance and chemical resistance thereof are not sufficient.

In order to solve such problem, there have been proposed: a method for co-hydrolyzing a perfluoroalkylethyl group-containing silane and various silane compounds such as a tetraalkoxysilane (see, for instance Document 2: JP-A-2002-53805); a system that is obtained by mixing and co-hydrolyzing a perfluoroalkyl group-containing silane, a disilane compound containing perfluoroalkylene as a spacer and a tetraalkoxysilane (see, for instance, Document 3: JP-B-6-29332); and a system that is obtained by mixing and co-hydrolyzing a perfluoroalkyl group-containing silane, a disilane compound containing a perfluoroalkylene as a spacer and an epoxy-functional silane (see, for instance, Document 4: Japanese Patent No. 2629813), which have succeeded in ensuring relatively proper stain resistance, scratch resistance, adherence and antireflection property.

Also, there has been known a composition that contains a disilane compound having a specific structure or its (partial) hydrolysate and realizes higher chemical resistance than related arts (see, for instance, JP-A-2004-315712).

However, when a related-art antireflection film formed of the organic film is formed on an upper surface of the hard coat layer containing the titanium oxide of the rutile type like an arrangement disclosed in Document 1, the durability of the hard coat layer and the scratch resistance, chemical resistance and thermal resistance of the organic antireflection film are not sufficient, thereby requiring further improvements of performances.

As for each of the compositions disclosed in Documents 2 to 4, the fluorine content is reduced. Accordingly, chemical resistance against chemical agents such as a household detergent, especially alkali resistance which is a weak point of polysiloxane system, is not sufficient, though such chemical resistance had been essentially proper in related arts. Thus, there is still a problem in practical use.

As for the composition disclosed in Document 5, when high heat is applied in a film forming process or other processes or when high heat is applied after the film forming process, cracks are likely generated. Especially, when a film is formed on a base material with plasticity such as a plastic, many cracks are generated Meanwhile, a thiourethane resin and an episulfide resin, which have been a mainstream of materials used for a plastic lens base material with high refractive index, each have a sulfur atom as a backbone. The sulfur atom hardly interacts with a polar group such as a silanol group in the organosilicon compound contained in the hard coat layer and is known to have a property to impede hardening of the hard coat layer itself, thus impeding adherence between the hard coat layer and the plastic lens base material. Especially, when the antireflection film formed of the organic film is formed on the upper surface of the hard coat layer, the adherence between the hard coat layer and the plastic lens base material is not sufficient, and in addition, moisture and oxygen having passed through the organic film degrade the hard coat layer. Thus, with the arrangement in which the antireflection film formed of the organic film is formed on the upper surface of the hard coat layer, it has been difficult to achieve sufficient durability (adherence and protection effect).

There is much demand for a tinted lens as a plastic lens for eye-glasses, and the plastic lens base material is often tinted with a disperse dye. In such case, since a dye exists on a surface of the plastic lens base material, the adherence between the hard coat layer and the plastic lens base material becomes lower as compared to non-tinted lenses. It has been found out that the disperse dye existing on the surface of the plastic lens base material is deteriorated by the ultraviolet ray and oxygen. Especially, when the antireflection film formed of the organic film is formed on the upper surface of the hard coat layer, this deterioration becomes significant, resulting in degrading the adherence between the hard coat layer and the plastic lens base material.

An object of the invention is therefore to provide, as an optical component having an antireflection film formed of an organic film, a plastic lens with enhanced durability of an antireflection film and a hard coat layer as well as a manufacturing method of the plastic lens.

DISCLOSURE OF INVENTION

The inventors of the invention has devoted to study the problems described above to find out that durability of optical articles can be enhanced by providing a primer layer between a plastic lens base material and a hard coat layer and providing an antireflection film formed of an organic film having specific compositions, thereby completing the invention.

A plastic lens according to an aspect of the invention includes: a plastic lens base material; a hard coat layer formed on the plastic lens base material; and an organic antireflection film formed on the hard coat layer. The plastic lens base material contains at least a sulfur atom. The hard coat layer is a coating film formed of a coating composition containing at least Component A and Component B below. The organic antireflection film is a coating film formed of a coating composition containing at least Component C, Component D and Component E, a refractive index of the antireflection film being lower than that of the hard coat layer by 0.10 or more. A primer layer is formed between the plastic lens base material and the hard coat layer. Component A to Component E is as follows:

Component A: fine metal oxide particles containing a titanium oxide with a rutile type crystalline structure.

Component B: an organosilicon compound represented by a general formula of $R^1SiX^1_3$ ($R^1$ represents an organic group with carbon number of 2 or more and having a polymerizable reactive group; and $X^1$ represents a hydrolyzable group).

Component C: an organosilicon compound represented by a general formula of $X_mR^2_{3-m}Si—Y—SiR^2_{3-m}X_m$ ($R^2$ represents a monovalent hydrocarbon group with carbon number of 1 to 6; Y represents a divalent organic group containing one or more fluorine atom; X represents a hydrolyzable group; and m represents an integer of 1 to 3).

Component D: an epoxy group-containing organic compound containing one or more epoxy group in a molecule.

Component E: fine silica particles with average particle size of 1 to 150 nm.

According to the aspect of the invention, by forming the primer layer between the plastic lens base material containing at least the sulfur atom and the hard coat layer formed of the coating composition containing Component A and Component B, the primer layer separates the sulfur atom in the plastic lens base material from the hard coat layer, since the sulfur atom impedes interaction between the hard coat layer and the plastic lens base material. In addition, with the primer layer on both interfaces between the plastic lens base material and the hard coat layer, adherence to both the plastic lens base material and to the hard coat layer can be obtained. In addition, the high adherence can also be achieved with tinted lenses. As a result, durability of the hard coat layer can be enhanced.

According to the aspect of the invention, the antireflection film of the plastic lens is the coating film formed of the coating composition containing: the organosilicon compound (Component C) represented by the general formula of $X_mR^2_{3-m}Si—Y—SiR^2_{3-m}X_m$ ($R^2$ represents the monovalent hydrocarbon group with carbon number of 1 to 6; Y represents the divalent organic group containing one or more fluorine atoms; X represents the hydrolyzable group; and m represents an integer of 1 to 3); and the epoxy group-containing organic compound (Component D) containing one or more epoxy groups in the molecule.

With the arrangement, due to Component C, the antireflection film formed of the organic film can realize a low refractive index and chemical resistance, which are properties a fluorocarbon resin essentially has. Due to the effect of the epoxy group contained in Component D, higher flexibility can be realized.

In the plastic lens according to the aspect of the invention, it is preferable that Component D contains at least one type selected from the group consisting of: a compound represented by a general formula of $R^3_nR^4_pSiZ_{4-[n+p]}$ ($R^3$ and $R^4$ each represent an organic group with carbon number of 1 to 16, at least one of $R^3$ and $R^4$ containing an epoxy group; Z represents a hydrolyzable group; and n and p each represent an integer of 0 to 2, an equation $1 \leq n+p \leq 3$ being satisfied); and a compound represented by a general formula (1) below:

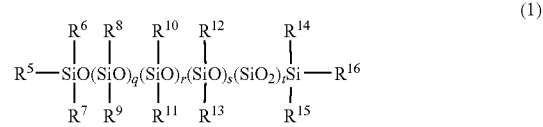

[$R^5$ to $R^{16}$ each represent an organic group, at least one of $R^5$ to $R^{16}$ containing an epoxy group; and q, r, s and t each represent an integer of 0 to 12].

According to the aspect of the invention, the coating film with high scratch resistance can be realized, and high adherence to the hard coat layer can also be realized.

In the plastic lens according to the aspect of the invention, it is preferable that the primer layer is a coating film formed of a coating composition containing Component F and Component G below.

Component F: an organic resin polymer having a polar group.

Component G: fine metal oxide particles containing a titanium oxide.

According to the aspect of the invention, the primer layer is the coating film formed of the coating composition containing Component F and Component G. The organic resin polymer having the polar group as Component F provides the primer layer with adherence to both the plastic lens base material and the hard coat layer. The fine metal oxide particles containing the titanium oxide as Component G enhance the refractive index of the primer layer, while allowing crosslink density of the primer layer to be enhanced as a filler, thereby enhancing water resistance and light resistance. The organic resin polymer used as a primer resin may contain the polar group as a backbone or may contain the polar group on a branch from the backbone. Examples of the former one may include a urethane bond and an ester bond, while examples of the latter one may include a hydroxyl group and an epoxy group. Such polar groups interact with a thiourethane bond or an episulfide group on the surface of the plastic lens base material and with an epoxy group or a silanol group on the surface of the hard coat layer, thus realizing excellent adherence.

In the plastic lens according to the aspect of the invention, it is preferable that Component F is a polyester resin.

According to the aspect of the invention, since Component F contained in the primer layer is the polyester resin, the adherence of the primer layer to the plastic lens base material having the sulfur atom can further be enhanced. In addition, the dispersibility of the fine metal oxide particles as Component G that function as the filler enhances the crosslink density of the primer layer, thus further enhancing the water resistance and the light resistance. Here, examples of the polyester resin may include that disclosed in JP-A-2000-144048. An ester bond in the polyester resin and a hydroxyl group or an epoxy group adhered to a side chain easily interact with surface molecules of the plastic lens base material, thereby realizing high adherence. Meanwhile, pH of the polyester resin tends to be mildly acidic, which tends to correspond to pH that allows the fine metal oxide particles as the filler to stably exist. Therefore, the fine metal oxide particles do not locally exist in the primer resin but disperse evenly, thus enhancing the crosslink density of the primer layer and enhancing the water resistance and the light resistance.

In the plastic lens according to the aspect of the invention, it is preferable that the primer layer contains fine metal oxide particles that are obtained by modifying surfaces of Component G with an organosilicon compound having an epoxy group.

According to the aspect of the invention, since the outermost surface of the fine metal oxide particles are modified with the organosilicon compound containing the epoxy group, bonding force with the polyester resin can be enhanced and the crosslink density of the primer layer can further be enhanced, thereby further enhancing the water resistance and the light resistance. Modifying the surface of the fine metal oxide particles with the organosilicon compound containing the epoxy group allows the fine metal oxide particles to interact with the ester bond, the hydroxyl group, the epoxy group, etc. in the polyester resin, thus enhancing stability in a primer structure. The epoxy group on the surface of the fine metal oxide particles causes ring-opening polymerization due to thermal curing, which contribute to the adherence to the plastic lens base material and the surface of the hard coat layer.

In the plastic lens according the aspect of the invention, it is preferable that the plastic lens base material contains a thiourethane resin and/or an episulfide resin. According to the aspect of the invention, the plastic lens base material containing the thiourethane resin and/or the episulfide resin are excellent in processability and safety and realizes high refractive index. When the plastic lens base material is used in combination with the antireflection film formed of the organic film that is formed as an upper layer of the surface of the plastic lens base material, difference in refractive indexes becomes large, thereby realizing the plastic lens (optical component) with excellent reflectivity.

In the plastic lens according to the aspect of the invention, it is preferable that a stainproof layer is formed on an upper surface of the antireflection film.

According to the aspect of the invention, since the stainproof layer is formed on the upper surface of the antireflection film, water/oil repellency of the surface of the plastic lens can be enhanced. The thickness of the stainproof layer is not particularly limited, but it is preferably in the range from 0.001 to 0.5 μm by taking into account a balance between the water/oil repellency effect and stickiness of the surface of the plastic lens. The thickness is more preferably in the range from 0.001 to 0.03 μm. As a substance for forming the stainproof layer, a fluorine-containing organosilicon compound is preferable in terms of the water/oil repellency effect.

According to another aspect of the invention, A manufacturing method of a plastic lens includes: polymerizing a polymerized composition containing a monomer having a sulfur atom in a molecule by cast-polymerization to obtain a plastic lens base material; forming a primer layer on the plastic lens base material; forming the hard coat layer on the primer layer using a coating composition containing at least Component A and Component B below; and forming an organic antireflection film on the hard coat layer using a coating composition containing at least Component C, Component D and Component E below, a refractive index of the antireflection film being lower than that of the hard coat layer by 0.10 or more. Component A to Component E are as follows.

Component A: fine metal oxide particles containing a titanium oxide with a rutile type crystalline structure.

Component B: an organosilicon compound represented by a general formula of $R^1SiX^1_3$ ($R^1$ represents an organic group with carbon number of 2 or more and having a polymerizable reactive group; and $X^1$ represents a hydrolyzable group).

Component C: an organosilicon compound represented by a general formula of $X_m R^2_{3-m} Si—Y—SiR^2_{3-m} X_m$ ($R^2$ represents a monovalent hydrocarbon group with carbon number of 1 to 6; Y represents a divalent organic group containing one or more fluorine atom; X represents a hydrolyzable group; and m represents an integer of 1 to 3).

Component D: an epoxy group-containing organic compound containing one or more epoxy group in a molecule.

Component E: fine silica particles with an average particle size of 1 to 150 nm.

According to the aspect of the invention, the manufacturing method includes: forming the primer layer on the plastic lens base material that is obtained by cast-polymerizing the polymerized composition that has the monomer containing the sulfur atom in the molecule; forming the hard coat layer on the primer layer using the coating composition containing at least Component A and Component B; and forming the organic antireflection film on the hard coat layer using the coating composition containing at least Component C, Component D and Component E, the antireflection film having refractive index lower than that of the hard coat layer by 0.10 or more. The formed primer layer separates the sulfur atom in the plastic lens base material from the hard coat layer, since the sulfur atom impedes interaction between the hard coat layer and the plastic lens base material. In addition, the primer layer exist on both interfaces of the plastic lens base material and the hard coat layer, providing adherence to both the plastic lens base material and the hard coat layer. Therefore, the plastic lens with enhanced durability of the hard coat layer can be obtained.

Incidentally, further forming the stainproof layer on the upper surface of the antireflection film can preferably enhance the water/oil repellency of the surface of the resulting plastic lens.

BEST MODE FOR CARRYING OUT THE INVENTION

Now, an exemplary embodiment of a plastic lens of the invention and a manufacturing method of the plastic lens will be described below.

The plastic lens of the exemplary embodiment includes; a plastic lens base material; a primer layer formed on a surface of the plastic lens base material; a hard coat layer formed on an upper surface of the primer layer; and an antireflection film formed on an upper surface of the hard coat layer. Detailed description will be given for each of the plastic lens base material, the primer layer, the hard coat layer and the antireflection film.

1 Plastic Lens Base Material

A material for the plastic lens base material (hereinafter, referred to as a lens base) is not particularly limited, but may be any material as long as the material is a plastic resin. However, in order to obtain difference in refractive indexes between the lens base and the antireflection film that is an organic film formed as an upper layer of the lens base, a lens material having refractive index of 1.6 or higher may be preferable in use. Examples of the lens material having the refractive index of 1.6 or higher may include: a polythiourethane plastic made by reacting a compound having an isocyanate group or an isothiocyanate group with a mercapto group; and an episulfide plastic made by polymerization-curing a material monomer containing a compound having an episulfide group.

As the compound having the isocyanate group or the isothiocyanate group, which is a main component of the polythiourethane plastic, known compounds can be used. Concrete examples of the compound having the isocyanate group may include ethylene diisocyanate, trimethylene diisocyanate, 2,4,4-trimethylhexane diisocyanate, hexamethylene diisocyanate, and m-xylylene diisocyanate.

As for the compound having the mercapto group, known compounds can be used. For example, there may be exemplified: an aliphatic polythiol such as 1,2-ethanedithiol, 1,6-hexanedithiol and 1,1-cyclohexanedithiol; and an aromatic polythiol such as 1,2-dimercapto benzene and 1,2,3-tris(mercaptomethyl)benzene. In order to provide the plastic lens with high refractive index, a polythiol containing a sulfur atom may be preferably used other than the mercapto group, concrete example of which may include 1,2-bis(mercaptomethylthio)benzene, 1,2,3-tris(mercaptoethylthio)benzene and 1,2-bis((2-mercaptoethyl)thio)-3-mercaptopropane.

As the compound containing the episulfide group used as the material monomer for the episulfide plastic, known compounds containing the episulfide group can be used without any limitation. For example, there may be exemplified an episulfide compound that is obtained by substituting a part or all of oxygen of the epoxy group contained in an existing epoxy compound with sulfur.

In order to provide the plastic lens with high refractive index, a compound containing the sulfur atom may preferably be used other than the compound containing the episulfide group. For example, there may be exemplified 1,2-bis(beta-epithiopropylthio)ethane, bis(beta-epithiopropyl) sulfide, 1,4-bis(beta-epithiopropylthiomethyl)benzene, and 2,5-bis(beta-epithiopropylthiomethyl)-1,4-dithiane, bis(beta-epithiopropyl) disulfide.

The polymerization method of the lens base in the invention is not particularly limited, and polymerization methods typically used in manufacturing the lens base may be employed. For example, when a vinyl monomer is used as a material, a thermal curing is performed using a thermopolymerization initiator such as an organic peroxide to manufacture the lens base. Alternately, using a photopolymerization initiator such as a benzophenone, the monomer is cured by irradiating ultraviolet rays to manufacture the lens base.

When the polythiourethane plastic that is manufactured by reacting the compound having the isocyanate group or the isothiocyanate group with the compound having the mercapto group is used, the lens base can be manufactured as follows: the compound having the isocyanate group or the isothiocyanate group and the compound having the mercapto group are blended, and then a curing catalyst for a urethane resin is added thereto, which are then mixed and heated for curing. Concrete examples of the curing catalyst may include: amine compounds such as an ethylamine, an ethylenediamine, a triethylamine, a tributylamine; a dibutyltin dichloride; and a dimethyltin dichloride.

When the episulfide plastic that is obtained by polymerizing a material monomer containing the compound having the episulfide group is used, the lens base can be manufactured as follows: a curing catalyst for an epoxy resin is added to the compound having the episulfide group or added to a mixture of the compound having the episulfide group and another monomer capable of copolymerization with the episulfide group, which are then mixed and heated for polymerization curing.

The curing catalyst for the epoxy resin is not particularly limited, concrete examples of which may include: tertiary amines such as dimethylbenzylamine, dimethylcyclohexylamine, diethylethanolamin, dibutylethanolamine and tridimethylaminomethyl phenol; and imidazoles such as ethylmethylimidazole. Examples of the monomer capable of copolymerizing with the compound having the episulfide group may include a compound having a hydroxyl group, a compound having a mercapto group, a primary amine, a secondary amine, and a compound having a carboxyl group.

Concrete examples of the compound having the hydroxyl group may include: alcohols such as an isopropyl alcohol and an n-hexyl alcohol; and polyhydric alcohols such as an ethylene glycol, a 1,6-hexanediol, a pentaerythritol dimethacrylate and a pentaerythritol diacrylate. Concrete examples of the compound having the mercapto group may include thiophenol, ethylthioglycolate, bis(2-mercaptoethyl)sulfide and 2,5-dimercaptomethyl-1,4-dithian.

2 Primer Layer

The primer layer is formed on the surface of the lens base. The primer layer exists on both interfaces of the lens base containing the sulfur atom and a hard coat layer (described later), the primer layer realizing adherence to both the lens base containing the inactive sulfur atom and the hard coat layer to enhance durability of a surface treatment film. In addition, the primer layer also functions as an impact absorbing layer for absorbing external impact, which enhances impact resistance. The primer layer is formed using the coating composition containing at least Component F and Component G shown below.

Component F: an organic resin polymer having a polar group

Component G: fine metal oxide particles containing a titanium oxide

Component F realizes adherence to both the lens base and the hard coat layer. Component G enhances refractive index of the primer layer while enhancing the crosslink density of the primer layer as the filler, thereby enhancing water resistance, weather resistance and light resistance. As Component F, there may be employed various resins such as a polyester resin, a polyurethane resin, an epoxy resin, a melamine resin, a polyolefin resin, an urethane acrylate resin, an epoxy acrylate resin and the like. Among these, the polyester resin is particularly preferable for use in terms of adherence to the lens base containing the sulfur atom and dispersibility of the fine metal oxide particles as the filler.

In the polyester resin, an ester bond in the resin and a hydroxyl group or an epoxy group adhered to a side chain easily interact with surface molecules of the plastic lens base material, thereby realizing high adherence. Meanwhile, pH of the polyester resin tends to be mildly acidic, which generally corresponds to pH that allows the fine metal oxide particles as the filler to stably exist. Therefore, the fine metal oxide particles do not locally exist in the primer resin but disperse evenly, thus stabilizing or enhancing the crosslink density of the primer layer and enhancing the water resistance and the light resistance.

As the polyester resin, there may be exemplified a polyester-based thermoplastic elastomer disclosed in JP-A-2000-144048. The polyester-based thermoplastic elastomer is a multiblock copolymer employing a polyester as a hard segment and a polyether or a polyester as a soft segment. Weight ratio of the hard segment (H) to the soft segment (S) is H/S=30/70 to 90/10, preferably 40/60 to 80/20.

The polyester of the hard segment is basically formed of dicarboxylic acids and a low-molecular glycol. The dicarboxylic acids may be: an aromatic dicarboxylic acid such as a terephthalic acid, an isophthalic acid, a phthalic acid, a 2,6-naphthalenedicarboxylic acid; a straight-chain saturated aliphatic dicarboxylic acid with carbon number of 4 to 20 such as a succinic acid, an adipic acid, an azelaic acid, a decamethylene dicarboxylic acid and an octadecane dicarboxylic acid; an aliphatic oxocarboxylic acid such as an epsilon-oxycaproic acid; a dimer acid (a dibasic acid obtained by dimerizing aliphatic monocarboxylic acid having a double bond); and an ester forming derivative of the above. Among these, the terephthalic acid and the 2,6-naphthalenedicarboxylic acid are particularly preferable for use.

The low-molecular glycol may be: an aliphatic glycol such as an ethylene glycol, a trimethylene glycol, a 1,4-butanediol, a 1,5-pentanediol, a 1,6-hexanediol and a neopentyl glycol; an aliphatic glycol such as a 1,6-cyclohexanedimethanol; and an ester forming derivative of the above. Among these, the ethylene glycol and the 1,4-butanediol are particularly preferable for use.

The polyester of the soft segment is formed of the dicarboxylic acids and a long chain glycol. Examples of the dicarboxylic acids may be those described above. The long chain glycol may be a poly(1,2-butadiene glycol), a poly(1,4-butadiene glycol) and a hydrogenated substance of the above. Also, an epsilon-caprolactone (C6), an enantholactone (C7) and a caprolactone (C8) may also be used as the polyester component. Among these, the epsilon-caprolactone is particularly preferable for use.

The polyether of the soft segment may be poly(alkylene oxide)glycols such as a poly(ethylene oxide)glycol, a poly(1,2-propylene oxide)glycol, a poly(1,3-propylene oxide)glycol and a poly(tetramethylene oxide)glycol, of which the poly(tetramethylene oxide)glycol is particularly preferable for use.

As for a manufacturing method of the polyester-based thermoplastic elastomer, for instance, a lower alkyl ester of the dicarboxylic acid, a long-chain aliphatic glycol and excessive low-molecular glycol are heated at a temperature between 150 to 200° C. under the presence of a catalyst such as a tetrabutyl titanate to perform transesterification and obtain a lower polymer. The lower polymer is stirred under the high-vacuum condition while heated at 220 to 280° C. to perform polycondensation. With the operation, the polyester-based thermoplastic elastomer can be obtained. The lower polymer may alternately be obtained by direct esterification reaction between the dicarboxylic acid and the long chain glycol and the low-molecular glycol.

The polyester-based thermoplastic elastomer may be used by mixing with another polymer, and, for instance, ordinal ester resins (PBT, PET, etc.), an amide resin and an amide-based thermoplastic elastomer may be arbitrarily used. A content of the polyester-based thermoplastic elastomer in the entire polymer is less than 50 mass %, preferably less than 30 mass %.

The polyester-based thermoplastic elastomer is prepared as a primer composition of a solution type. However, in terms of processability and environmental protection, the polyester-based thermoplastic elastomer is preferably used as a primer composition of an aqueous emulsion. The aqueous emulsion can be obtained by known methods. Specifically, there may be preferably employed a forced emulsion method in which a polymer is forcibly emulsified by a high mechanical shearing under the presence of a surfactant (external emulsifier)

Component G is the fine metal oxide particles containing the titanium oxide, average particle size of which should be 1 to 200 nm, preferably 5 to 30 nm. The fine metal oxide particles may contain only the titanium oxide or may contain the titanium oxide and other inorganic oxides. For example, as the inorganic oxides, oxides of metals such as Si, Al, Sn, Sb, Ta, Ce, La, Fe, Zn, W, Zr and In may be mixed with the titanium oxide. The fine metal oxide particles of Component G may be fine composite particles of the titanium oxide and other inorganic oxides. For example, when the fine composite particles with other inorganic oxides are used, oxides of metals such as Si, Al, Sn, Sb, Ta, Ce, La, Fe, Zn, W, Zr and In may be used with the titanium oxide.

It is preferable to use Component G by dispersing Component G in a carrier medium, e.g., water, alcohol or other organic solvents. In such case, in order to enhance dispersion stability of the fine metal oxide particles, the surfaces of the fine metal oxide particles are treated with an organosilicon compound or an amine compound. Examples of organosilicon compound used in the treatment may include a monofunctional silane, a bifunctional silane, a trifunctional silane and a tetrafunctional silane.

Examples of the amine compound may include: an alkylamine such as an ammonium, an ethylamine, a triethylamine, an isopropylamine and an n-propylamine; an aralkylamine such as a benzylamine; an alicyclic amine such as a piperidine; and an alkanolamine such as a monoethanolamine and a triethanolamine. Among these, fine metal oxide particles with their outermost surfaces be modified by the organosilicon compound containing the epoxy group is preferably used in order to enhance a bonding force with the polyester resin, enhance the crosslink density of the primer layer, and enhance the water resistance, the weather resistance and the light resistance. Note that loadings of the organosilicon compound or the amine compound is preferably in the range from 1 to 15% in relation to the mass of the fine inorganic oxide particles.

The fine metal oxide particles containing the titanium oxide, which is Component G, preferably contains composite oxide nuclear particles having a rutile type crystalline structure. However, when the fine metal oxide particles containing the titanium oxide having the rutile type crystalline structure is used for the later-described hard coat layer, the hard coat layer will have an ultraviolet ray absorptivity, so that fine composite oxide particles containing the related-art titanium oxide of anatase type crystalline structure can be used for the primer layer.

Further, a tin oxide can be used as the fine inorganic oxide particles other than the titanium oxide. For example, there may be preferably used the fine inorganic oxide particles that are obtained as follows: fine composite particles of the tin oxide (tin oxide particles) and zirconium oxide particles or fine composite particles of the tin oxide particles, the zirconium oxide particles and silicon oxide particles are used as nucleuses. Surfaces of such nucleuses are coated with composite colloidal particles that are formed of one type or two or more types selected from the group consisting of a silicon oxide, a zirconium oxide, an antimony pentoxide and an aluminum oxide. Although the refractive index of the tin oxide is lower than that of the titanium oxide and usage amount of the tin oxide has to be increased to obtain the primer layer with high refractive index, photoactivation effect of the tin oxide is lower than that of the titanium oxide, so that the tin oxide is preferable for use in combination with the titanium oxide when the durability of the primer layer and the hard coat layer is required.

However, in terms of the light resistance and the refractive index, it is more preferable to use the fine composite oxide particles containing the titanium oxide having the rutile type crystalline structure also for the primer layer. The fine composite oxide particles containing the titanium oxide of the rutile type crystalline structure is excellent in the light resistance, and in addition, has higher refractive index as compared to that of the anatase type, which allows the usage amount thereof in the primer layer to be reduced, so that a resin component contributing to the adherence can be increased.

Thus-obtained coating composition for forming the primer layer may be diluted with a solvent as needed for use. The solvent may be alcohols, esters, ketones, ethers, aromatics and the like. In addition to the components above, a small amount of additives can be added, as needed, to the coating composition to improve coating property of a coating liquid, curing speed and film performance after curing, examples of the additives including a metal chelate compound, a surfactant, an antistatic agent, an ultraviolet absorber, an antioxidant, a disperse dye, an oil color, a pigment, a photochromic compound, and a light/thermal stabilizer such as a hindered phenol and a hindered amine.

Further, in coating with the coating component (coating liquid), it is effective to treat the surface of the lens base in advance by alkali treatment, acid treatment, surfactant treatment, peeling/grinding treatment using inorganic or organic fine particles, or plasma treatment in order to enhance adherence between the lens base and the primer layer. As for a coating/curing method of the coating composition, the coating composition is applied to the lens base by dipping, spin coating, spray coating, roll coating, flow coating, or the like, which is then heated at 40 to 200° C. for several hours and dried to form the primer layer.

As for contents of Components F and G, the content of Component F is preferably 20 to 80 parts by mass relative to 100 parts by mass of the total amount of Components F and G, more preferably 40 to 60 parts by mass. When the content of Component F exceeds 80 parts by mass, the content of Component G is reduced, which leads to too low refractive index and results in generation of an interference fringe and degradation of appearance. In addition, when the content of Component G as the filler is small, the crosslink density is lowered, which results in insufficient water resistance and light resistance. On the other hand, when the content of Component F is less than 20 parts by mass, the adherence to the plastic lens base material and to the hard coat layer becomes insufficient.

The thickness of the primer layer is preferably in the range from 0.01 to 50 μm, particularly preferably in the range from 0.1 to 30 μm. When the primer layer is too thin, basic performances such as the water resistance and the impact resistance cannot be realized. On the other hand, when the primer layer is too thick, smoothness of the surface is degraded, which causes degradation of appearance such as optical distortion, white turbidity and cloud.

3 Hard Coat Layer

The hard coat layer is formed on the primer layer that is formed on the surface of the lens base. The hard coat layer contains at least Component A and Component B below.

Component A: fine metal oxide particles containing a titanium oxide having a rutile type crystalline structure.

Component B: an organosilicon compound represented by a general formula of $R^1SiX^1_3$ ($R^1$ represents an organic group with carbon number of 2 or more and having a polymerizable reactive group; and $X^1$ represents a hydrolyzable group.)

Specifically, the hard coat layer is a coating film formed of a coating composition containing at least Component A and Component B as described above. Component A may be, for instance, fine inorganic oxide particles having average particle size of 1 to 200 nm and containing a composite oxide that is formed of the titanium oxide and a tin oxide or the titanium oxide, the tin oxide and a silicon oxide, the composite oxide having a rutile type crystalline structure. Component B may be an organosilicon compound represented by the general formula of $R^1SiX^1_3$ ($R^1$ represents an organic group with carbon number of 2 or more and having a polymerizable reactive group; and $X^1$ represents a hydrolyzable group).

For the purpose of preventing interference fringes, the hard coat layer requires a high refractive index, which is about as high as that of the plastic lens base material. In order to provide the hard coat layer with the high refractive index, a method using fine inorganic oxide particles having high refractive index is typically employed. Specifically, an oxide(s) of one type or two or more types of metals selected from the group consisting of Al, Sn, Sb, Ta, Ce, La, Fe, Zn, W, Zr, In and Ti (including mixture thereof) and/or transparent fine inorganic oxide particles formed of a composite oxide containing two or more metals. Above these, the fine inorganic oxide particles containing the titanium oxide is typically used in terms of refractive index, transparency, dispersion stability, etc.

However, there has been a problem as follows in using the fine inorganic oxide particles containing the titanium oxide as a metal oxide for the hard coat layer. The titanium oxide is activated when receiving a light energy (ultraviolet ray) and decomposes an organic substance with its strong oxidative decomposition effect (hereinafter, referred to as a photoactivation effect). As a result, when the titanium oxide is contained as a component of the hard coat layer, it decomposes organic substances such as a silane coupler as another main component due to its photoactivation effect, which generates cracks and film peeling of the hard coat layer and degrades durability thereof.

To solve this problem, it is preferable to use the metal oxide containing the titanium oxide having the rutile type crystalline structure. Specifically, using the fine metal oxide particles containing the titanium oxide having the rutile type crystalline structure can overcome various problems caused by the photoactivation effect of the titanium oxide. More specifically, using the metal oxide containing the titanium oxide having the rutile type crystalline structure instead of the one having the anatase type can enhance the weather resistance and the light resistance. In addition, since a refractive index of a crystal of the rutile type is higher than that of the anatase type, the fine inorganic oxide particles having relatively high refractive index can be obtained.

The titanium oxide having the rutile type crystalline structure has low photoactivation effect unlike the titanium oxide of the anatase type which is activated when receiving the light energy (ultraviolet ray) and decomposes the organic substance with its strong oxidative decomposition effect. The mechanism is as follows: when light (ultraviolet ray) is irradiated, an electron of valence band of the titanium oxide is excited to produce an OH free radical and a $HO_2$ free radical. This strong oxidizing power decomposes the organic substances. Since the titanium oxide of the rutile type is more stable in thermal energy than the titanium oxide of the anatase type, the titanium oxide of the rutile type produces extremely small amount of the free radicals. Accordingly, since the hard coat layer containing the titanium oxide having the rutile type crystalline structure is excellent in the weather resistance and the light resistance, it can prevent the antireflection film formed of the organic film from being deteriorated, so that the plastic lens with excellent weather resistance and light resistance can be obtained.

Although there may be some available methods to obtain the titanium oxide having the rutile type crystalline structure, it is preferable to use the titanium oxide as a composite oxide with the tin oxide or as a composite oxide with the tin oxide and the silicon oxide. When the composite oxide containing the titanium oxide and the tin oxide is employed, contents of the titanium oxide (as converted to $TiO_2$) and the tin oxide (as converted to $SnO_2$) contained in the fine inorganic oxide particles are preferably in the mass ratio of $TiO_2/SnO_2=1/3$ to 20/1, more preferably 1.5/1 to 13/1.

When the content of $SnO_2$ is below the above-described range of the mass ratio, the crystalline structure is shifted from the rutile type to the anatase type, which produces a mixed crystal containing a crystal of the rutile type and a crystal of the anatase type, or produces a crystal of the anatase type. On the other hand, when the content of $SnO_2$ exceeds the above-described range of the mass ratio, a rutile type crystalline structure that is intermediate between the rutile type crystalline structure of the titanium oxide and the rutile type structure of the tin oxide is produced, which is a crystalline structure different from the rutile type crystalline structure of the titanium oxide. In addition, refractive index of the resulting fine inorganic oxide particles is lowered.

When the composite oxide containing the composite oxide of the titanium oxide and the tin oxide and further containing the silicon oxide is employed, contents of the titanium oxide (as converted to $TiO_2$), the tin oxide (as converted to $SnO_2$) and the silicon oxide (as converted to $SiO_2$) contained in the fine inorganic oxide particles are preferably in the mass ratio of $TiO_2/SnO_2=1/3$ to 20/1, more preferably 1.5/1 to 13/1, and in the mass ratio of $(TiO_2+SnO_2)/SiO_2=55/45$ to 99/1, more preferably 70/30 to 98/2.

Although the content of $SnO_2$ is the same as in the case where the composite oxide containing the tin oxide and the titanium oxide is employed, by adding the silicon oxide to the composite oxide, stability and dispersibility of the resulting fine inorganic oxide particles can be enhanced. Here, when the content of $SiO_2$ is below the above-described range of the mass ratio, the stability and the dispersibility are degraded. On the other hand, when the content of $SiO_2$ exceeds the above-described range of the mass ratio, the stability and dispersibility can be further enhanced, but refractive index of the resulting fine inorganic oxide particles is lowered, which is not preferable. However, the free radicals are also produced with the titanium oxide of the rutile type. This is also the same in a case where the fine inorganic oxide particles that contain two or more types of composite oxides containing the titanium oxide is used as the fine inorganic oxide particles containing the titanium oxide.

Thus, the hard coat layer of the plastic lens of the invention is preferably a coating film formed of a coating composition containing Component A and Component B described below. Component A is fine metal oxide particles that include particles obtained by coating surfaces of nucleus particles of the composite oxide that has the rutile type crystalline structure and is formed of the titanium oxide and the tin oxide or formed of the titanium oxide, the tin oxide and the silicon oxide with a coating layer of a composite oxide formed of the silicon oxide and a zirconium oxide and/or an aluminum oxide, the average particle size of the fine metal oxide particles being 1 to 200 nm. Component B is the organosilicon compound represented by general formula of $R^1SiX^1_3$ ($R^1$ represents an organic group with carbon number of 2 or more and having a polymerizable reactive group; and $X^1$ represents a hydrolyzable group).

As described earlier, when light (ultraviolet ray) is irradiated to the titanium oxide, an electron of valence band of the titanium oxide is excited to produce an OH free radical and a $HO_2$ free radical. This strong oxidizing power decomposes the organic substances. Since the titanium oxide of the rutile type is more stable in thermal energy than the titanium oxide of the anatase type, the titanium oxide produces extremely small amount of the free radicals. However, since the free radicals are produced even in the titanium oxide of the rutile type, it is preferable to use particles obtained by coating the surfaces of the nucleus particles of the composite oxide with the coating layer of the composite oxide formed of the silicon oxide, the zirconium oxide and/or the aluminum oxide. This is because the free radicals produced from the nucleus particles are unstable though having strong oxidizing power, so that the free radicals will disappear due to catalysis of the coating layer during passing through the coating layer.

Contents of the titanium oxide and the tin oxide or contents of the titanium oxide, the tin oxide and the silicon oxide contained in the nucleus particles are the same as those described above. Contents of the silicon oxide, the zirconium oxide and the aluminum oxide contained in the coating layer is preferably selected from ranges shown in (a) to (c) below depending on combination of the composite oxide to be used.

(a) In a case where the coating layer is formed of a composite oxide of the silicone oxide and the zirconium oxide, contents of the silicone oxide (as converted to $SiO_2$) and the zirconium oxide (as converted to $ZrO_2$) contained in the coating layer are preferably in the mass ratio of $SiO_2/ZrO_2=50/50$ to 99/1, preferably 65/35 to 90/10.

When the content of $ZrO_2$ exceeds the above-described range of the mass ratio, Zr atoms that can trap the free radicals increase. However, a distortion occurs on the coating layer and a precise coating layer cannot be formed, so that the free radicals produced by the nucleus particles come out on the surfaces of the fine inorganic oxide particles, thereby causing oxidation of the organic substance. When the content of $ZrO_2$ is below the above-described range of the mass ratio, a precise coating layer can be formed more easily. However, Zr atoms that trap the free radicals decrease, so that the free radicals produced by the nucleus particles come out on the surfaces of the fine inorganic oxide particles, thereby causing oxidation of the organic substance.

(b) In a case where the coating layer is formed of a composite oxide of the silicone oxide and the aluminum oxide, contents of the silicone oxide (as converted to $SiO_2$) and the aluminum oxide (as converted to $Al_2O_3$) contained in the coating layer are preferably in the mass ratio of $SiO_2/Al_2O_3=60/40$ to 99/1, preferably 68/32 to 95/5.

When the content of $Al_2O_3$ exceeds the above-described range of the mass ratio, Al atoms that can trap the free radicals increase. However, a precise coating layer cannot be formed, so that the free radicals produced by the nucleus particles come out on the surfaces of the fine inorganic oxide particles, thereby causing oxidation of the organic substance. When the content of $Al_2O_3$ is below the above-described range of the mass ratio, a precise coating layer can be formed more easily. However, Al atoms that trap the free radicals decrease, so that the free radicals produced by the nucleus particles come out on the surfaces of the fine inorganic oxide particles, thereby causing oxidation of the organic substance.

(c) In a case where the coating layer is formed of a composite oxide of the silicone oxide, the zirconium oxide and the aluminum oxide, contents of the silicone oxide (as converted to $SiO_2$), the zirconium oxide (as converted to $ZrO_2$) and the aluminum oxide (as converted to $Al_2O_3$) contained in the coating layer are preferably in the mass ratio of $SiO_2/(ZrO_2+Al_2O_3)$=98/2 to 6/4, preferably 95/5 to 7/3.

When the total of the contents of $ZrO_2$ and $Al_2O_3$ exceeds the above-described range of the mass ratio, Zr atoms and Al atoms that can trap the free radicals increase. However, a precise coating layer cannot be formed, so that the free radicals produced by the nucleus particles come out on the surfaces of the fine inorganic oxide particles, thereby causing oxidation of the organic substance. When the total of the contents of $ZrO_2$ and $Al_2O_3$ is below the above-described range of the mass ratio, a precision coating layer can be formed more easily. However, Al atoms and Zr atoms that trap the free radicals decrease, so that the free radicals produced by the nucleus particles come out on the surfaces of the fine inorganic oxide particles, thereby causing oxidation of the organic substance. Thickness of the coating layer should be in the range from 0.02 to 2.27 nm, and preferably in the range from 0.16 to 1.14 nm in order to prevent the free radicals produced in the nucleus particles from coming out on the surfaces of the fine inorganic oxide particles and prevent the organic substance from being oxidized.

Note that the composite oxide of the nucleus particles refers to: a composite oxide solid solution formed of the titanium oxide and the tin oxide (including those doped) and/or a composite oxide cluster thereof; or a composite oxide solid solution formed of the titanium oxide, the tin oxide and the silicone oxide (including those doped) and/or a composite oxide cluster thereof. The composite oxides constituting the nucleus particles and/or the coating layer may be a composite hydrous oxide that has an OH group as an end group, and may partially include the composite hydrous oxide.

The average particle size of the fine inorganic oxide particles containing the titanium oxide should be in the range form 1 to 200 nm, preferably from 5 to 30 nm. When the average particle size is below 1 nm, the particles are bridged and not shrunk evenly in a drying step for forming the hard coat layer on the plastic lens base material, where a shrinkage factor is lowered, so that the hard coat layer having sufficient film hardness cannot be obtained. On the other hand, when the average particle size exceeds 200 nm, the hard coat layer is whitened, which makes the hard coat layer less suitable for an application as the optical component.

The fine inorganic oxide particles containing the titanium oxide having the rutile type crystalline structure may be used solely or used in combination with other fine inorganic oxide particles. The other fine inorganic oxide particles may be those formed of an oxide(s) of one type or two or more types of metals selected from the group consisting of Si, Al, Sn, Sb, Ta, Ce, La, Fe, Zn, W, Zr and In (including mixture thereof) and/or those formed of a composite oxide containing two or more types of metals.

A concrete example of the fine inorganic oxide particles may be a dispersion sol in which the fine inorganic oxide particles containing the titanium oxide having the rutile type crystalline structure (average particle size of 1 to 200 nm) are dispersed in a colloidal form in water, alcohols or other organic solvents. As a commercially-available dispersion sol, there may be exemplified a dispersion sol for coating (Optolake manufactured by CATALYSTS & CHEMICALS INC. CO., LTD.) that contains fine inorganic oxide particles obtained by coating surfaces of nucleus particles of the composite oxide that has the rutile type crystalline structure and is formed of the titanium oxide and the tin oxide or formed of the titanium oxide, the tin oxide and the silicon oxide with a coating layer of a composite oxide formed of the silicon oxide and the zirconium oxide and/or the aluminum oxide, the average particle size of the fine inoraganice oxide particles being 8 to 10 nm.

In addition, in order to enhance dispersion stability of the coating composition, the fine inorganic oxide particles may be used by treating the surfaces thereof with an organosilicon compound, a amine compound or carboxylic acids such as a tartaric acid and a maleic acid. Examples of the organosilicon compound used in the treatment may include a monofunctional silane, a bifunctional silane, a trifunctional silane and a tetrafunctional silane. The treatment may be performed with a hydrolyzable group being untreated or being hydrolyzed. After the hydrolysis, a state in which the hydrolyzable group is reacted with a —OH group of the fine particles is preferable, but even a state in which a part of the hydrolyzable group remains does not affect the stability.

Examples of the amine compound may include: an alkylamine such as an ammonium, an ethylamine, a triethylamine, an isopropylamine and an n-propylamine; an aralkylamine such as a benzylamine; an alicyclic amine such as a piperidine; and an alkanolamine such as a monoethanolamine and a triethanolamine.

The type or loadings of the fine inorganic oxide particle may be determined depending on targeted hardness, refractive index and the like. However, the loadings is preferably in the range from 5 to 80 mass % of a solid content in the hard coat composition, more preferably, 10 to 50 mass %. Too small loadings might cause insufficient abrasion resistance of the coating film. On the other hand, too large loadings might cause cracks on the coating film as well as insufficient dye-affinity.

Next, Component B (organosilicon compound represented by the general formula of $R^1SiX^1_3$) will be described. Component B functions as a binder of the hard coat layer. In the general formula of Component B, $R^1$ is the organic group with carbon number of 2 or more and having the polymerizable reactive group. $R^1$ has a polymerizable reactive group such as a vinyl group, an allyl group, an acryl group, a methacryl group, a 1-methylvinyl group, an epoxy group, a mercapto group, a cyano group, an isocyano group and an amino group. While, $X^1$ is a hydrolysable functional group which may be exemplified by alkoxy groups such as a methoxy group, an ethoxy group and a methoxyethoxy group, halogen groups such as a chloro group and a bromo group, an acyloxy group and the like.

Examples of the organosilicon compound of Component B may include vinyltrialkoxysilane vinyltrichlorosilane, Vinyl-tri(beta-methoxy-ethoxy)silane, allyltrialkoxysilane, acryloxypropyltrialkoxysilane, methacryloxypropyltrialkoxysilane, gamma-glycidoxypropyltrialkoxysilane, beta-(3,4- epoxycyclohexyl)-ethyltrialkoxysilane, mercaptopropyltrialkoxysilane, gamma-aminopropyltrialkoxysilane, etc. Two or more types of the organosilicon compounds may be used in combination as the organosilicon compound of Component B.

In order to manufacture a hard coat liquid for forming the hard coat layer by mixing Component A and Component B, it is preferable to mix a sol with Component A being dispersed therein with Component B. The loadings of Component A may be determined depending on hardness, refractive index and the like of the hard coat layer. However, the loadings is preferably in the range from 5 to 80 mass % of a solid content in the hard coat liquid, more preferably, 10 to 60 mass %. Smaller loadings might cause insufficient abrasion resistance of the hard coat layer. On the other hand, larger loadings might cause cracks on the hard coat layer. In addition, larger loadings might also cause degradation of dye-affinity when the hard coat layer is tinted.

It is very effective to contain a polyfunctional epoxy compound in the hard coat layer in addition to Component A and Component B. The polyfunctional epoxy compound enhances adherence of the hard coat layer to the primer layer, while enhancing water resistance of the hard coat layer and impact resistance of the plastic lens. Incidentally, existence of a hydroxyl group in molecules of the polyfunctional epoxy compound has been known to enhance the adherence to the primer layer. Accordingly, by using a polyfunctional epoxy group containing one or more hydroxyl groups in one molecule, the loadings of the polyfunctional epoxy group can be reduced, thereby enhancing scratch resistance. Especially, when an organic film is formed as an antireflection film (described later) on an upper surface of the hard coat layer, thickness of the antireflection film likely becomes very thin. In addition, when fine silica particles with internal pores are used for the antireflection film, the antireflection film becomes easier to pass moisture, so that the hard coat layer requires water resistance. Therefore, the polyfunctional epoxy compound is quite effective.

Examples of the polyfunctional epoxy compound may include: an aliphatic epoxy compound such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentylglycol hydroxypivalate ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris(2-hydroxyethyl) isocyanate, triglycidyl ether of tris(2-hydroxyethyl)isocyanate; a cycloaliphatic epoxy compound such as isophoronediol diglycidyl ether, bis-2,2-hydroxycyclohexylpropane diglycidyl ether; and an aromatic epoxy compound such as resorcin diglycidyl ether, bisphenol A diglycidyl ether, bisphenol F diglycidyl ether, bisphenol S diglycidyl ether, orthophthalic acid diglycidyl ether, phenolic novolac polyglycidyl ether, cresol novolac polyglycidyl ether.

Among these, it is preferable to use the aliphatic epoxy compound such as the 1,6-hexanediol diglycidyl ether, the diethylene glycol diglycidyl ether, the triethylene glycol diglycidyl ether, the trimethylolpropane triglycidyl ether, the glycerol diglycidyl ether, the glycerol triglycidyl ether and the triglycidyl ether of the tris(2-hydroxyethyl)isocyanate.

In addition, a curing catalyst may be added to the hard coat layer. Examples of the curing catalyst may include: perchloric acids such as a perchloric acid, an ammonium perchlorate and a magnesium perchlorate; an acetylacetonato having, as a central metal atom, Cu(II), Zn(II), Co(II), Ni(II), Be(II), Ce(III), Ta(III), Ti(III), Mn(III), La(III), Cr(III), V(III), Co(III), Fe(III), Al(III), Ce(IV), Zr(IV), V(IV) etc.; an amine, an amino acid such as a glycine; a Lewis acid; and an organic metallic salt.

Among these, a preferable curing catalyst may be the magnesium perchlorate and the acetylacetonato having, as the central metal atom, Al (III) or Fe(III). Especially, the acetylacetonato having, as the central metal atom, Fe(III) is the most preferable. The loadings of the curing catalyst is preferably in the range from 0.01 to 5.0 mass % in a solid content concentration of the hard coat liquid.

Thus-obtained coating composition for the hard coat layer may be diluted with a solvent as needed for use. The solvent may be alcohols, esters, ketones, ethers, aromatics and the like. The coating composition for the hard coat layer may contain, as needed, a small amount of an additive in order to improve coating property of the coating liquid, curing speed and film performance after curing, examples of the additive being a metal chelate compound, a surfactant, an antistatic agent, a ultraviolet absorber, an antioxidant, a disperse dye, an oil color, a pigment, a photochromic compound, a light/thermal stabilizer such as a hindered phenol and a hindered amine and the like.

As for a coating/curing method of the coating composition, the coating composition is applied by dipping, spin coating, spray coating, roll coating or flow coating, and then heated at 40 to 200° C. for several hours and dried to form the hard coat layer. Thickness of the hard coat layer is preferably 0.05 to 30 µm. When the thickness is below 0.05 µm, basic performance of the hard coat layer cannot be realized. On the other hand, when the thickness exceeds 30 µm, smoothness of the surface might be degraded or optical distortion might occur.

4 Antireflection Film

The antireflection film is formed on the hard coat layer. The antireflection film to be formed has a refractive index lower than that of the hard coat layer by 0.1 or more, and is an organic film having thickness of 50 nm to 150 nm. The antireflection film contains at least Component C, Component D and Component E. Component C is an organosilicon compound represented by a general formula of $X_m R^2_{3-m} Si—Y—SiR^2_{3-m} X_m$ ($R^2$ represents a monovalent hydrocarbon group with carbon number of 1 to 6; Y represents a divalent organic group containing one or more fluorine atoms; X represents a hydrolyzable group; and m represents an integer of 1 to 3). Component D is an epoxy group-containing organic compound containing one or more epoxy group in a molecule. Component E is fine silica particles with an average particle size of 1 to 150 nm.

The organic film forming the antireflection film is not particularly limited, but may be any organic film as long as it has a lower refractive index than that of the hard coat layer by 0.10 or more, has the thickness of 50 nm to 150 nm, and contains Components C, D and E as essential components. The organic film may be formed using one type or two or more types selected from the group consisting of a silicone resin, an acryl resin, an epoxy resin, an urethane resin, a melamine resin. Among these, when taking account for various properties for the plastic lens such as thermal resistance, chemical resistance, scratch resistance, etc., it is preferable to form a low-refractive-index layer containing the silicone resin and the epoxy resin, where fine-particle type inorganic substances other than Component E may be added for enhancing surface hardness and adjusting refractive index. The fine-particle type inorganic substances that may be added is a sol in which a fine-particle type inorganic substance is dispersed in a colloidal form. In terms of low refractive index, a magnesium fluoride sol, a calcium fluoride sol and the like may be exemplified.

Herein, Component C is the organosilicon compound represented by the general formula of $X_m R^2_{3-m} Si-Y-SiR^2_{3-m} X_m$. Y in the formula represents the divalent organic group having one or more fluorine atoms, and the number of fluorine atoms is preferably 4 to 50, more preferably 4 to 24. Especially, in order to realize various performances such as antireflection property, stain resistance and water repellency, a large number of the fluorine atoms is preferably contained. However, when the number of the fluorine atoms is too large, the crosslink density is lowered, which might cause insufficient scratch resistance. Accordingly, a structure as follows is preferable for Y.

—CH$_2$CH$_2$(CF$_2$)$n$CH$_2$CH$_2$—

—C$_2$H$_4$—CF(CF$_3$)—(CF$_2$)$n$—CF(CF$_3$)—C$_2$H$_4$—

[n represents an integer of 2 to 20]

n in the above structure needs to be any value in the range from 2 to 20, preferably from 2 to 12, and more preferably from 4 to 10. When n is below the above-described range, various performances such as antireflection property, stain resistance and water repellency might not be sufficiently obtained. On the other hand, when n exceeds the range, the crosslink density is lowered, which might cause insufficient scratch resistance.

$R^2$ represents the monovalent hydrocarbon group with carbon number of 1 to 6. Specifically, there may be exemplified an alkyl group such as a methyl group, an ethyl group, a propyl group, a butyl group, a hexyl group, a cyclohexyl group; and a phenyl group. The methyl group is preferable to obtain proper scratch resistance.

m represents an integer of 1 to 3, preferably 2 or 3. Especially, m=3 is preferable in order to obtain a film with particularly high hardness.

X represents the hydrolyzable group. Concrete examples of the hydrolyzable group may include: a halogen atom of Cl or the like; an organooxy group represented by ORX (RX is a monovalent hydrocarbon group with carbon number of 1 to 6); an alkoxy group such as a methoxy group, an ethoxy group, a propoxy group, an isopropoxy group, a butoxy group; an alkenoxy group such as an isopropenoxy group; an acyloxy group such as an acetoxy group; a ketoxime group such as a methyl ethyl ketoxime group; and an alkoxy group such as a methoxyethoxy group. Among these, the alkoxy group is preferable. Especially, a silane compound of the methoxy group and the ethoxy group is preferable since these are easy to handle and to control reaction in hydrolysis.

As a concrete example of Component C, the following structure can be exemplified.

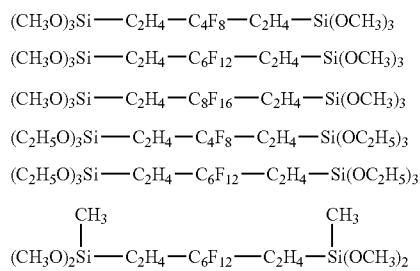

Content of Component C in a total amount of a resin component in the coating composition for forming the antireflection film is in the range from 60 to 99 mass %, preferably in the range from 60 to 90 mass %. With the arrangement, the chemical resistance of the film formed of the organosilicon compound of Component C can be enhanced, and thus alkali resistance, which has been a weak point of a related-art polysiloxane film, can be enhanced.

Any appropriate epoxy group-containing organic compound that has one or more epoxy groups in the molecule of Component D may be used. The epoxy group-containing organic compound is preferably contained in the composition by an amount in the range from 5 to 20 mass % of the total amount of the resin component. When the content is below the range, crack resistance and adherence to the hard coat layer cannot be sufficiently enhanced. On the other hand, when the content exceeds the range, abrasion resistance of the film might be degraded.

The epoxy group-containing organic compound is preferably one or more types of compounds selected from the group consisting of: a compound represented by a general formula of $R^3_n R^4_p SiZ_{4-[n+p]}$ ($R^3$ and $R^4$ each represent organic groups with carbon numbers of 1 to 16, and at least one of them should contain the epoxy group; Z represents a hydrolyzable group; and n and p each represent an integer of 0 to 2, where an equation $1 \leq n+p \leq 3$ should be satisfied); and a compound represented by a general formula (1) (shown below). In this case, the crack resistance can further be enhanced without degrading the chemical resistance and abrasion resistance of the film. A total content of these compounds is preferably in the range from 1 to 20 mass % in the total amount of the resin component. When the total content is too small, the crack resistance cannot be enhanced sufficiently. On the other hand, when the total content is too large, the chemical resistance and the abrasion resistance might be degraded.

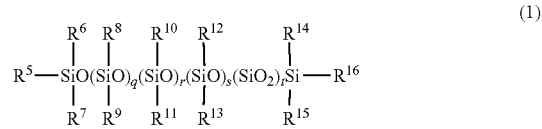

[$R^5$ to $R^{16}$ each represent an organic group, at least one of which contains the epoxy group. q, r, s and t each represent an integer of 0 to 12.]

Compounds represented by the above-described general formula $R^3_n R^4_p SiZ_{4-[n+p]}$ may be appropriately selected in accordance with targeted properties such as adherence to lens base, hardness and low reflectivity of the resulting film, a lifetime of the composition, example of which may include: glycidoxymethyltrimethoxysilane, glycidoxymethyltriethoxysilane, alpha-glycidoxyethyltrimethoxysilane, alpha-glycidoxyethyltriethoxysilane, beta-glycidoxyethyltriethoxysilane, beta-glycidoxypropyltrimethoxysilane, alpha-glycidoxypropyltrimethoxysilane, alpha-glycidoxypropyltriethoxysilane, beta-glycidoxypropyltriethoxysilane, gamma-glycidoxypropyltrimethoxysilane, (3,4-epoxycyclohexyl)methyltrimethoxysilane, gamma-glycidoxypropyl vinyl diethoxysilane, gamma-glycidoxypropyl phenyl diethoxy silane and delta-(3,4-epoxycyclohexyl) butyltriethoxysilane.

In the compounds represented by the general formula (1), $R^5$ to $R^{16}$ in the formula may be an organic group such as a proper hydrocarbon group like the methyl group. At least one of $R^5$ to $R^{16}$ contains the epoxy group, which may be exemplified by the one having a structure shown below.

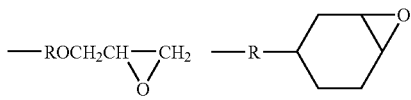

[R is a hydrocarbon group represented by $C_uH_{2u}$. u represents an integer of 1 to 12.]

Concrete examples of such compounds in those represented by the general formula (1) may include ones as shown below.

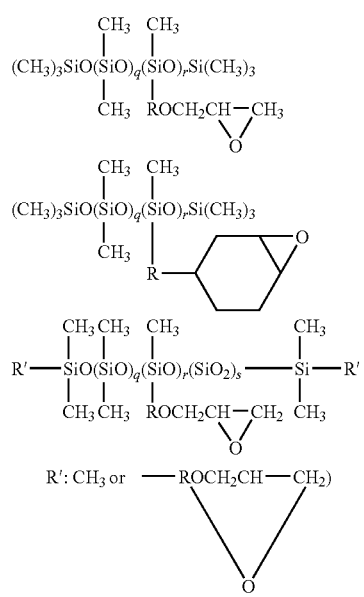

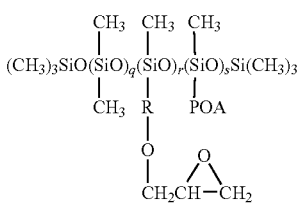

[POA represents a polyether group, preferably —$C_3H_6O$ ($C_2H_4O)a(C_3H_6O)_b$R'. a and b each represent an integer of 0 to 12. R' represents a hydrocarbon group.]

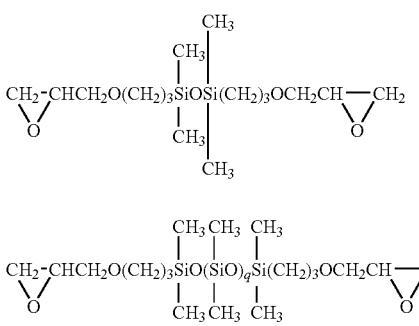

As the epoxy group containing organic compound, any appropriate epoxy compound may be used in addition to those represented by a general formula $R^3nR^4pSiZ_{4-[n+p]}$ and represented by the general formula (1). Examples of such epoxy compound may be as follows.

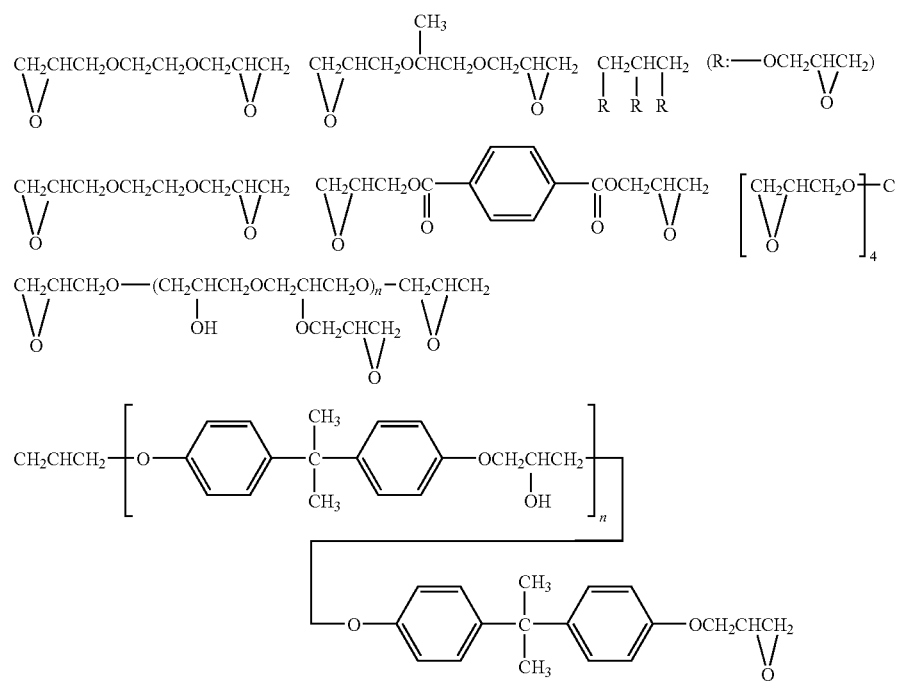

-continued

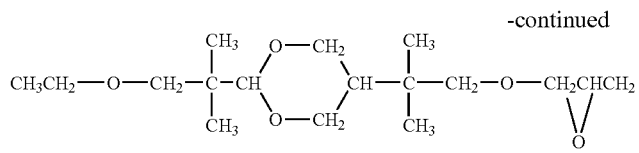

As the fine silica particles of Component E, there may be exemplified a silica sol in which, for instance, fine silica particles with the average particle size of 1 to 150 nm are dispersed in a colloidal form in a carrier medium constituted by water, alcohols or other organic solvents. In order to realize low refractive index, it is preferable to use a silica sol containing fine silica particles with internal pores or voids. With air or solvent that has lower refractive index than the silica contained in the internal pores, such silica can have lower refractive index than fine silica particles without internal pores, thereby realizing low refractive index of the antireflection film.

The fine silica particles having internal pores may be manufactured in a method disclosed in JP-A-2001-233611 and the like. In the invention, it is preferable to use fine silica particles with the average particle size in the range from 20 to 150 nm and with the refractive index in the range from 1.16 to 1.39. When the average particle size of the particles is below 20 nm, voidage inside the particles becomes small, so that a desired low refractive index cannot be obtained. On the other hand, when the average particle size exceeds 150 nm, haze of the organic film increases, which is not preferable. The fine silica particles having the internal pores as described above may be exemplified by a dispersion sol that contains porous fine silica particles with the average particle size of 20 to 150 nm and with the refractive index of 1.16 to 1.39 (THRULYA and L'ECUME manufactured by CATALYSTS & CHEMICALS INC. CO., LTD.).

In the coating composition for the antireflection film, other fine particles may be used in combination with Component E. As the total loadings of the fine particles, its mass ratio to other resin component is not particularly limited, but it is preferably set in the range from fine particles/other resin component (solid content)=80/20 to 10/90, more preferably in the range from 50/50 to 15/85. When the mass ratio of the fine particles exceeds 80, a mechanical strength of a hardening film obtained by the coating composition might be lowered. On the other hand, when the mass ratio of the fine particles is below 10, it might be difficult to obtain the hardening film with low refractive index.

In addition to the components described above, as organosilicon compounds that can be contained in the coating composition for the antireflection film, there may be exemplified: silicates such as a tetraethoxysilane; alkylsilanes such as a methyltrimethoxysilane, a hexyltrimethoxysilane, and a decyltrimethoxysilane; phenylsilanes such as a phenyltrimethoxysilane; and silane couplers such as a gamma-aminopropyltriethoxysilane and a gamma-mercaptopropyltrimethoxysilane.

Content of such organosilicon compound may be 20 mass % or lower of the total amount of the resin component. When the content is too large, the crack resistance of the film might be lowered, and hydrophilicity increases to cause chemical resistance to be lowered.

As another organosilicon compound, an alkyl fluoride group-containing alkoxysilane represented by a general formula of RF—SiX₃ [RF represents a monovalent hydrocarbon group containing one or more fluorine atoms; and X represents a hydrolyzable group] may be contained. With such organosilicon compound, the refractive index of the resulting film can further be lowered.

In the general formula of RF—SiX₃ the number of the fluorine atoms contained in RF is 3 to 25, preferably 3 to 17. Especially, a structural unit as shown below does not contain a polar part, which is particularly preferable.

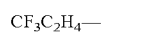

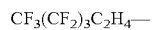

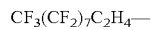

The hydrolyzable group represented by X may be the same as those in Component C.

The alkyl fluoride group-containing alkoxysilane represented by the general formula of RF—SiX₃ may be exemplified by the one shown below.

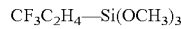

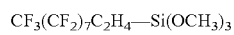

A content of alkyl fluoride group-containing alkoxysilane represented by the general formula of RF—SiX₃ and its hydrolysate (partial hydrolysate) can be properly adjusted. However, when the loadings becomes too large, the scratch resistance of the film is degraded, so that it is preferable to set the content in the range from 1 to 30 mass % of the total amount of the resin component, more preferably 10 mass % or lower. As still another organosilicon compound, there may be exemplified a dialkylsiloxy-based hydrolyzable organosilane represented by a general formula shown below.

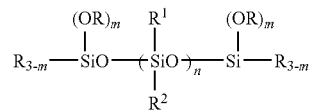

[R¹, R² and R each represent an alkyl group; m represents an integer of 1 to 3; and n represents an integer of 2 to 200.]

Such dialkylsiloxy-based hydrolyzable organosilane may be exemplified by the one having a structure a shown below.

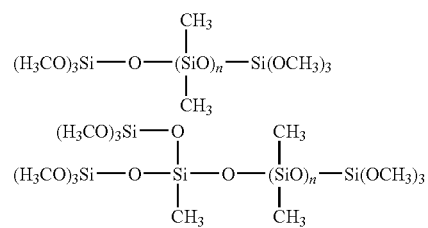

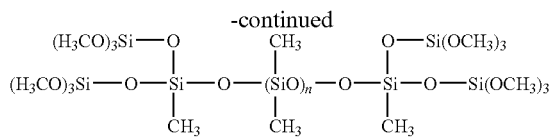

In addition, a small amount of additives may be added, as needed, to the coating composition of the antireflection film in order to enhance coating property of the coating liquid and the film performance after curing, example of the additives may include the above-described curing catalyst, a photopolymerization initiator, an acid generator, a surfactant, an antistatic agent, an ultraviolet absorber, an antioxidant such as a hindered phenol, a light stabilizer such as a hindered amine, a disperse dye, an oil color, a fluorescence dye, a pigment and the like.

The antireflection film as described above can be formed as the organic film with low refractive index on the hard coat layer by a wet process, using the coating composition containing Component C, Component D and Component E. An inorganic film formed by a dry process such as vapor deposition or sputtering has low thermal resistance due to great difference in coefficient of thermal expansion from that of the hard coat layer as a lower layer formed of the organic film. In contrast, the antireflection film of the organic film formed by the wet process exhibits small difference in coefficient of thermal expansion from that of the hard coat layer, so that cracks due to heating less likely occur, thereby realizing excellent thermal resistance. Also, since the wet process is available, large equipment such as a vacuum device is not required, so that the antireflection film can be formed with ease.

Known methods can be employed as a film forming method of the antireflection film having low refractive index using the wet process, which may be dipping, spin coating, spray coating and flow coating. Among these forming methods, the dipping or the spin coating is preferable in order to evenly form a thin film having thickness of 50 to 150 nm on a curved surface like the plastic lens. Incidentally, when the antireflection film of low refractive index is formed on the hard coat layer, the surface of the hard coat layer is preferably subjected to pretreatment. As a concrete example of the pretreatment, there may be exemplified a method in which the surface of the hard coat layer is hydrophilized (Contact angle θ=60° or smaller) by surface grinding, UV/ozone cleaning, plasma treatment or the like.

Specifically, the forming method of the antireflection film includes steps as follows. First, the organosilicon compound of Component C is diluted with an organic solvent, to which the organosilicon compound of Component D is added. Then, water, diluted hydrochloric acid, acetic acid or the like is added thereto as needed to generate hydrolysis. Further, a material in which the fine silica particles of Component E are dispersed in the colloidal form in an organic solvent is added. Then, the curing catalyst, the photopolymerization initiator, the acid generator, the surfactant, the ultraviolet absorber, the antioxidant or the like may be added. The mixture is fully stirred to be used as a coating liquid.

At this time, a concentration to which the coating liquid is diluted is preferably, as a solid content, 0.5 to 15 mass % relative to a solid content after curing, more preferably 1 to 10 mass %. When the solid content concentration exceeds 15 mass %, even if a pull speed is slow in the dipping or even if a spinning speed is high in the spin coating, a desired film thickness is hard to be obtained and the film becomes undesirably thick. On the other hand, when the solid content concentration is below 0.5 mass %, even if the pull speed is high in the dipping or even if the spinning speed is low in the spin coating, a desired film thickness is hard to be obtained and the film becomes thinner than required. Also, too high pull speed or too low spinning speed likely greatens unevenness of coating on the lens, which cannot be compensated even with the use of the surfactant or the like.

After applying the coating liquid on the plastic lens, although the coaling liquid may be cured by applying heat, ultraviolet ray or both of them to obtain the antireflection film, it is preferable to cure by heating. Heating temperature in the heating may be determined depending on a composition of the coating composition, thermal resistance of the lens base and the like, which is preferably 50 to 200° C., more preferably 80 to 140° C.

Thickness of the resulting antireflection film is required to be in the range from 50 to 150 nm. With thickness of either below or above the range, sufficient antireflection effect cannot be obtained. In order to allow the antireflection film to function properly, refractive index of the antireflection film should be different from that of the lower hard coat layer by 0.10 or more, preferably 0.15 or more, and more preferably 0.20 or more. Specifically, the refractive index is preferably in the range from 1.30 to 1.45.

For the plastic lens that is obtained by forming the primer layer, the hard coat layer and the antireflection film on the lens base, a stainproof layer formed of a fluorine-containing organosilicon compound can further be formed on the antireflection film, in order to enhance the water/oil repellency of the surface of the plastic lens. As the fluorine-containing organosilicon compound, it is preferable to use a fluorine-containing silane compound represented by a general formula (2) shown below.

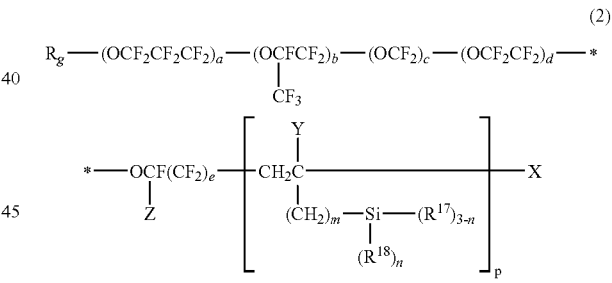

(2)

$R_g$ in the general formula (2) is a straight-chained or branched perfluoroalky group with carbon number of 1 to 16, preferably $CF_3—$, $C_2F_5—$, $C_3F_7—$. X represents an iodine or a hydrogen, Y represents a hydrogen or a lower alkyl group, and Z represents a fluorine or a trifluoromethyl group. $R^{17}$ represents a hydrolysable group, which is preferably $—OR^{19}$, $—OCOR^{19}$, $—OC(R^{19})=C(R^{20})_2$, $—ON=C(R^{19})_2$, and $—ON=CR^{21}$. A chlorine, $—OCH_3$ and $—OC_2H_5$ are more preferable. Here, $R^{19}$ represents an aliphatic hydrocarbon group or an aromatic hydrocarbon group, $R^{20}$ represents a hydrogen or a lower aliphatic hydrocarbon group, and $R^{21}$ represents a divalent aliphatic hydrocarbon group with carbon number of 3 to 6.

$R^{18}$ represents a hydrogen or an inactive monovalent organic group, which is preferably a hydrocarbon group with carbon number of 1 to 4. a, b, c and d each represent an integer of 0 to 200, preferably 1 to 50, while e represents an integer of 0 or 1. m and n each represent an integer of 0 to 2, preferably 0. p represents an integer of 1 or more, preferably 1 to 10. A molecular mass should be $5*10^2$ to $1*10^5$, preferably $5*10^2$ to $1*10^4$.

A preferable structure of the fluorine-containing silane compound represented by the general formula (2) may be exemplified by the one represented by a general formula (3) as shown below. In the general formula (3) below, q represents an integer of 1 to 50, m represents an integer of 0 to 2, and r represents an integer of 1 to 10.

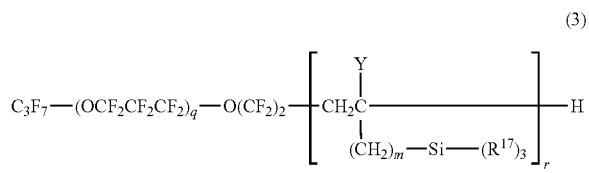

(3)

The fluorine-containing silane compound represented by the general formula (2) or (3) is solved in an organic solvent, which can be prepared as a water repellent agent having a predetermined concentration and applied onto the antireflection film for coating. As the coating methods, dipping, spin coating, spray coating, flow coating, a doctor blade method, roll coating, gravure coating, curtain coating, brushing and the like are available.

The organic solvent is preferably an organic compound with carbon number of 4 or more and having a perfluoro group that well solves the fluorine-containing silane compound. Examples of such organic solvent may include perfluorohexane, perfluorocyclobutane, perfluorooctane, perfluorodecane, perfluoromethylcyclohexane, perfluoro-1,3-dimethylcyclohexane, perfluoro-4-methoxybutane, perfluoro-4-ethoxybutane and metaxylene hexafluoride. Also, a perfluoroether oil and a chlorotrifluoroethylene oligomer oil may also be used. In addition, from 225 (a mixture of $CF_3CF_2CHCl_2$ and $CClF_2CF_2CHClF$) may be used. One type or two or more types of these organic solvents may be used solely or in combination.

A concentration into which the fluorine-containing silane compound is diluted with the organic solvent is preferably in the range from 0.03 to 1 mass %. When the concentration is too low, it becomes difficult to form the stainproof layer having a sufficient thickness, thereby causing insufficient water/oil repellency. On the other hand, when the concentration is too high, the stainproof layer might be too thick, which might require rinsing to eliminate coating unevenness after coating.

The thickness of the stainproof layer is not particularly limited, but it is preferably in the range from 0.001 to 0.5 μm. The thickness is more preferably in the range from 0.001 to 0.03 μm. When the stainproof layer is too thin, the water/oil repellency becomes poor, while when the stainproof layer is too thick, the surface becomes sticky. In addition, when the thickness of the stainproof layer exceeds 0.03 μm, the antireflection effect is undesirably degraded.

When the dipping is employed as the coating method of the water repellent agent, the plastic lens is dipped in the water repellent agent that has been prepared to have a predetermined concentration using the organic solvent, and after a predetermined time period, the plastic lens is pulled up at a predetermined speed. Here, the dipping time may preferably be in the range from 0.5 to 3 minutes. The dipping time shorter than 0.5 minutes causes insufficient adsorption of the water repellent agent to the surface of the plastic lens, so that a predetermined repelling performance cannot be obtained. On the other hand, the dipping time exceeding 3 minutes causes increase in cycle time, which is not preferable. The pull speed is preferably in the range from 100 mm/min to 300 mm/min. Although the pull speed is determined in relation to the concentration of the water repellent agent, the pull speed of slower than 100 mm/min causes too thin stainproof layer, so that a predetermined stain resistance cannot be obtained. On the other hand, the pull speed exceeding 300 mm/min causes too thick stainproof layer, which might require an additional process for rinsing to eliminate unevenness of coating after coating.

EXAMPLE

Next, examples and comparisons based on the exemplary embodiment of the invention will be described.

Example 1

1 Preparation of Primer Composition

Methyl alcohol of 3700 parts by mass, water of 250 parts by mass and propylene glycol monomethyl ether of 1000 parts by mass were put in a stainless steel container and stirred sufficiently. Then, a fine composite particle sol of 2800 parts by mass, which mainly contained a titanium oxide, a zirconium oxide and a silicon oxide (anatase type crystalline structure, methanol dispersion and total solid content concentration of 20 mass %; Optolake 1120Z U-25•A8 manufactured by CATALYSTS & CHEMICALS INC. CO., LTD.), was added and further stirred. Next, a polyurethane resin of 2200 parts by mass was added and further stirred, and a silicone-based surfactant of 2 parts by mass (L-7604 manufactured by Nippon Unicar Company Limited) was added and stirred for a whole day, which was then filtered using a filter with 2 μm mesh to obtain a primer composition.

2 Preparation of Hard Coat Composition

Butyl cellosolve of 1000 parts by mass was put in a stainless steel container, and gamma-glycidoxypropyltrimethoxysilane of 1200 parts by mass was added and stirred sufficiently. Then, 0.1 mol/l acetic acid of 300 parts by mass was added and stirred for a whole day to obtain a silane hydrolysate. A silicone-based surfactant of 30 parts by mass (L-7001 manufactured by Nippon Unicar Company Limited) was added to the silane hydrolysate and stirred for 1 hour, and a fine composite particle sol of 7300 parts by mass, which mainly contain a titanium oxide, a tin oxide and a silicon oxide (rutile type crystalline structure, methanol dispersion; Optolake 1120Z, 8RU-25•A17 manufactured by CATALYSTS & CHEMICALS INC. CO., LTD), was added and stirred for 2 hours. Next, an epoxy resin of 250 parts by mass (DENACOL EX-313 manufactured by Nagase ChemteX Corporation) was added and stirred for 2 hours, and Fe(III) acetylacetonato 20 parts by mass was added and stirred for 1 hour, which was filtered using a filter with 2 μm mesh to obtain a hard coat composition.

3 Preparation of Low-Refraction Film Coating Composition

A silane compound of 47.8 parts by mass (0.08 mol), which was represented by a formula (A) as shown below, was put in a stainless steel container. Methanol of 312.4 parts by mass, gamma-glycidoxypropyltrimethoxysilane (epoxy group-containing organic compound) of 4.7 parts by mass (0.02 mol) and 0.1N (0.1 mol/l) aqueous hydrochloric acid of 36 parts by mass were added, which were mixed well to obtain a liquid mixture. The liquid mixture was stirred for 2 hours in a constant temperature bath of 25° C. to obtain a silicone resin with a solid content of 10 mass %.

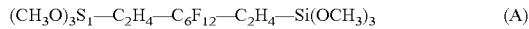

$$(CH_3O)_3S_1\text{---}C_2H_4\text{---}C_6F_{12}\text{---}C_2H_4\text{---}Si(OCH_3)_3 \quad (A)$$

The silicone resin and a porous silica-isopropanol dispersion sol (solid content concentration of 20 mass %, average primary particle size of 35 nm, and outer shell thickness of 8 nm manufactured by CATALYSTS & CHEMICALS INC. CO., LTD.) were blended by a solid content ratio of silicone resin/porous silica=70/30. Then, a propylene glycol monomethyl ether of 935 parts by mass was added for dilution to obtain a low-refraction film coating composition with a solid content of 3 mass %.

4 Formation of Primer Layer, Hard Coat Layer and Antireflection Film

A thiourethane plastic lens base material (refractive index of 1.67, SEIKO SUPER SOVEREIGN manufactured by SEIKO EPSON CORPORATION) was prepared. The prepared lens base was subjected to alkali treatment, in which the lens base was dipped in a 2.0 normal aqueous potassium hydroxide maintained at 50° C. for 5 minutes, rinsed with purified water, and then dipped in a 0.5 normal sulfuric acid maintained at 25° C. for 1 minute to be neutralized. The lens base was then rinsed with purified water, dried and cooled. Then, the lens base was dipped in the primer composition prepared in "Preparation of Primer Composition" in Example 1, pulled up at a pull speed of 30 cm/min and burned at 80° C. for 20 minutes to form the primer layer on the surface of the lens base. Then, the lens base with the primer layer was dipped in the hard coat composition prepared in "Preparation of Hard Coat Composition" in Example 1, pulled up at a pull speed of 30 cm/min and burned at 80° C. for 30 minutes to form the hard coat layer on the primer layer. Thereafter, the lens base was heated at an oven set to 125° C. for 3 hours to obtain a plastic lens with the primer layer and the hard coat layer. The thickness of the formed primer layer was 0.5 μm, and the thickness of the formed hard coat layer was 2.5 μm.

The plastic lens with the primer layer and the hard coat layer was subjected to plasma treatment (atmospheric plasma). The plastic lens was then dipped in the low-refraction film coating composition prepared in "Preparation of Low-Refraction Film Coating Composition" in Example 3, pulled up at a pull speed of 5 cm/min and burned at 80° C. for 30 minutes. Then, the plastic lens was heated in an oven set to 100° C. for 2 hours to form an antireflection film formed of a low-refraction film, and the plastic lens with the primer layer, the hard coat layer and the antireflection film was obtained. The thickness of the formed antireflection film was 100 nm.

Next, a stainproof layer was formed on the obtained plastic lens. A stainproof agent was prepared by diluting a fluorine-containing silane compound (KY-130 manufactured by Shin-Etsu Chemical Co., Ltd.) with perfluorohexane to obtain 0.3% solution. Using the stainproof agent, a stainproof layer was formed by dipping. Specifically, the plastic lens was dipped in the stainproof agent for 1 minute, pulled up at a pull speed of 200 mm/min, and dried at an ambient temperature to form the stainproof layer.

Example 2

The plastic lens with a primer layer, the hard coat layer, the antireflection layer and the stainproof layer was obtained using the same hard coat composition and low-refraction film coating composition as those in Example 1 and by the same manufacturing method as Example 1. The only thing that was different from Example 1 was a primer composition for forming the primer layer, in which a polyester resin was used in place of the organic resin polymer, and a fine composite particle sol containing fine metal oxide particles mainly formed of a titanium oxide, a zirconium oxide and a silicon oxide (anatase type crystalline structure, methanol dispersion, total solid content of 20 mass %; Optolake 1120Z U-25•G manufactured by CATALYSTS & CHEMICALS INC. CO., LTD.) was used.

Example 3

The plastic lens with a primer layer, the hard coat layer, the antireflection layer and the stainproof layer was obtained using the same hard coat composition and low-refraction film coating composition as those in Example 1 and by the same manufacturing method as Example 1. The only thing that was different from Example 1 was a primer composition for forming the primer layer, in which a polyester resin was used in place of the organic resin polymer, and a fine composite particle sol containing fine metal oxide particles mainly formed of a titanium oxide, a tin oxide and a silicon oxide (rutile type crystalline structure, methanol dispersion, total solid content of 20 mass %; Optolake 1120Z 8RU-25•A17 manufactured by CATALYSTS & CHEMICALS INC. CO., LTD.) was used.

Example 4

The plastic lens with a primer layer, the hard coat layer, the antireflection layer and the stainproof layer was obtained using the same hard coat composition and low-refraction film coating composition as those in Example 1 and by the same manufacturing method as Example 1. The only thing that was different from Example 1 was a primer composition for forming the primer layer, in which a polyester resin was used in place of the organic resin polymer, and a fine composite particle sol containing fine metal oxide particles mainly formed of a titanium oxide, a tin oxide and a silicon oxide (rutile type crystalline structure, methanol dispersion, total solid content of 20 mass %; Optolake 1120Z 8RU-25•G manufactured by CATALYSTS & CHEMICALS INC. CO., LTD.) was used.

Comparison 1

A plastic lens with a hard coat layer, the antireflection film and the stainproof layer was obtained using the same low-refraction film coating composition as Example 1 and using the same manufacturing method as Example 1. The only thing that was different from Example 1 was that the primer layer was not formed and the hard coat layer was formed directly on the surface of the plastic lens base material using a hard coat composition as shown below.

1 Preparation of Hard Coat Composition

Butyl cellosolve of 1000 parts by mass was put in a stainless steel container, and gamma-glycidoxypropyltrimethoxysilane of 1200 parts by mass was added and stirred sufficiently. Then, 0.1 mol/l acetic acid of 300 parts by mass was added and stirred for a whole day to obtain a silane hydrolysate. A silicone-based surfactant of 30 parts by mass (L-7001 manufactured by Nippon Unicar Company Limited) was added to the silane hydrolysate and stirred for 1 hour, and a fine composite particle sol of 7300 parts by mass, which mainly contain a titanium oxide, a tin oxide and a silicon oxide (Optolake 1120 Z 8RU-25•A17 manufactured by CATALYSTS & CHEMICALS INC. CO., LTD.) was added and stirred for 2 hours. Next, an epoxy resin of 250 parts by mass (DENACOL EX-313 manufactured by Nagase ChemteX Corporation) was added and stirred for 2 hours, and Fe(III) acetylacetonato of 20 parts by mass was added and stirred for 1 hour, which was filtered using a filter with 2 μm mesh to obtain a hard coat composition.

2 Formation of Hard Coat Layer and Antireflection Film

A thiourethane plastic lens base material (refractive index of 1.67, SEIKO SUPER SOVEREIGN manufactured by SEIKO EPSON CORPORATION) was prepared. The prepared lens base was subjected to alkali treatment, in which the lens base was dipped in a 2.0 normal aqueous potassium hydroxide maintained at 50° C. for 5 minutes, rinsed with purified water, and then dipped in a 0.5 normal sulfuric acid maintained at 25° C. for 1 minute to be neutralized. The lens base was then rinsed with purified water, dried and cooled. Then, the lens base was dipped in the hard coat composition prepared in "Preparation of Hard Coat Composition" in Comparison 1, pulled up at a pull speed of 30 cm/min and burned at 80° C. for 30 minutes. Then, the plastic lens was heated in an oven set to 125° C. for 3 hours to form the hard coat layer on the surface of the lens base. Then, the plastic lens with the hard coat layer was subjected to plasma treatment, and the antireflection film formed of the low-refraction film was formed on the hard coat layer to obtain the plastic lens with the hard coat layer and the antireflection film. Further, the same stainproof layer as in Example 1 was formed on the plastic lens. The thickness of the hard coat layer was 2.5 μm.

Comparison 2

The plastic lens with a primer layer, the hard coat layer, the antireflection layer and the stainproof layer was obtained using the same primer composition, and low-refraction film coating composition as those in Example 1 and by the same manufacturing method as Example 1. The only thing that was different from Example 1 was fine metal oxide particles used in forming the hard coat layer, in which a fine composite particle sol mainly containing a titanium oxide, a zirconium oxide and a silicon oxide (anatase type crystalline structure, methanol dispersion, total solid content of 20 mass %; Optolake 1120Z U-25•A8; manufactured by CATALYSTS & CHEMICALS INC. CO., LTD.) was used as the fine metal oxide particles in place of the fine composite particle sol mainly containing the titanium oxide, the tin oxide and the zirconium oxide.

Comparison 3

A plastic lens with the primer layer, the hard coat layer, the antireflection film and the stainproof layer was obtained using the same primer composition and hard coat composition as Example 1 and by a similar manufacturing method to Example 1. The only thing that was different from Example 1 was that an inorganic substance was vacuum-deposited in stead of applying the low-refraction film coating composition in forming the antireflection film. In order to form the antireflection film, the plastic lens with the primer layer and the hard coat layer was placed in a vacuum evaporation device, where the plastic lens was heated to 85° C. while the air was exhausted. The plastic lens was then processed using an ion-gun (carrier gas: oxygen, voltage: 400 EV, processing time: 30 seconds). After the air was exhausted until a degree of vacuum reaches $5.0*10^{-5}$ mbar, a deposition material is vapor-deposited by an electron beam heating. The antireflection film having seven layers $SiO_2$ (30 nm)/$TiO_2$ (20 nm)/$SiO_2$ (35 nm)/$TiO_2$ (55 nm)/$SiO_2$ (20 nm)/$TiO_2$ (35 nm)/$SiO_2$ (95 nm) was formed, the seven layers formed in order of mention from the hard coat layer side.

Comparison 4

In replace of the low-refraction film coating composition, prepared in Example 1 tetraethoxysilane of 20.8 parts by mass (0.10 mol), methanol of 37.3 parts by mass and 0.1N (0.1 mol/l) aqueous hydrochloric acid of 1.8 parts by mass were mixed well to obtain a liquid mixture. The liquid mixture was stirred for 2 hours in a constant temperature bath of 25° C. to obtain a silicone resin with a solid content of 10 mass %.

The silicone resin and a porous silica-isopropanol dispersion sol (solid content concentration of 20 mass %, average primary particle size of 35 nm, and outer shell thickness of 8 nm; manufactured by CATALYSTS & CHEMICALS INC. CO., LTD.) are blended by a solid content ratio of silicone resin/porous silica=70/30. Then, a propylene glycol monomethyl ether of is added for dilution to obtain a low-refraction film coating composition with a solid content of 3 mass %.

Properties of the plastic lenses (hereinafter, referred to as lenses) obtained in Examples 1 to 4 and in Comparisons 1 to 4 were evaluated by evaluation methods below. The results are shown in Table 1. In the evaluation, ten items were evaluated: interference fringe, reflectivity, scratch resistance, initial adhesion, moisture resistance, hot water resistance, light resistance, alkali resistance, thermal resistance and impact resistance. Each of the evaluation methods will be described below.

1 Interference Fringes

A lens was held up to a three-band fluorescent lamp to visually observe generation condition of interference fringes on the lens surface. The lens was evaluated by the following criteria.

A: Almost no interference fringes

B: Interference fringes clearly observed

2 Reflectivity

Reflectivity of a lens was measured by a spectrophotometer, which was converted to a reflectivity with its luminosity corrected in accordance with measured luminosity curve.

3 Scratch Resistance

A steel wool #0000 was applied onto a lens surface by a load of 1 kg and reciprocated between a distance of 3 to 4 cm for 10 times. Scratches on the lens surface were visually observed and evaluated by the following criteria.

A: Almost no scratches

B: 1 to 5 scratches observed

C: 6 to 20 scratches observed

D: 21 or more scratches observed, but not caused cloud of the lens

E: Too many scratches observed, and caused cloud of the lens

4 Initial Adhesion

A lens surface was cut into 100 tessellated pieces by 1 mm pitch. An adhesive tape (Cellotape (registered trademark) manufactured by NICHIBAN CO., LTD.) was firmly adhered to the cut portion and peeled off quickly. Film peeling condition of the tessellated pieces after peeling off the tape was evaluated by the following criteria a to e.

a: No film peeling occurred (number of peeled pieces=0/100)

b: Almost no film peeling occurred (number of peeled pieces=1-5/100)

c: A little peeling occurred (number of peeled pieces=6-20/100)

b: Film peeling occurred (number of peeled pieces=21-50/100)

e: Poor adhesion (number of peeled piece=51-100/100)

5 Moisture Resistance

A lens was left in a thermo-hygrostat (40° C., 90 RH %) for 10 days. After taking out from the thermo-hygrostat, the lens was left under the ambient temperature for 3 hours, and an adherence test was conducted on the lens. The adherence test was conducted by the same method and the same evaluation criteria as those of the initial adhesion. Lenses employed in this moisture resistance test were tinted lenses that had been prepared by tinting plastic lenses. Each of the tinted lenses was prepared as follows. A tinting pot in which 2 gram of Seiko Plax Diamond Coating Dye Gray-D was dispersed in 1 litter of purified water (95° C.) was prepared. A plastic lens was dipped in the tinting pot for 10 minutes. Then, the plastic lens was taken out from the tinting pot and cleaned by wiping using an acetone. A primer layer, a hard coat layer and an antireflection film were formed on the plastic lens by a method shown in each Example and Comparison.

bath of 60° C. for 30 minutes. The lens was then taken out from the constant temperature bath, left under the ambient temperature for 1 hour for cooling. Generation of cracks were evaluated. If no crack was generated, the lens was again placed in the constant temperature bath of 65° C. for another 30 minutes, and generation of cracks were evaluated. Thereafter, the lens was placed into the constant temperature bath with its temperature raised by 5° C. for each 30-minute cycle until a crack was generated. A temperature at the time of generation of the crack was determined to be a thermal resistance limit temperature of the lens.

10 Impact Resistance

A steel ball of 16.3 gram was vertically dropped onto a lens from a height of 127 cm. A lens that was not broken was evaluated as A, while a lens that was broken or allowed the steel ball to pass through was evaluated as B.

Result

TABLE 1

| | Interference fringe | Reflectivity | Scratch resistance | Initial adhesion | Moisture resistance | Hot water resistance | Light resistance | Alkali resistance | Light resistance | Impact resistance |
|---|---|---|---|---|---|---|---|---|---|---|
| Example 1 | A | 98.6 | A | a | b | b | b | b | 130 | A |
| Example 2 | A | 98.6 | A | a | a | a | b | a | 130 | A |
| Example 3 | A | 98.5 | A | a | b | b | a | b | 130 | A |
| Example 4 | A | 98.4 | A | a | a | a | a | a | 130 | A |
| Comparison 1 | A | 98.5 | B | a | a | a | e | b | 120 | B |
| Comparison 2 | A | 98.5 | A | a | d | d | e | b | 130 | A |
| Comparison 3 | A | 98.5 | A | a | a | c | a | a | 70 | A |
| Comparison 4 | A | 98.3 | A | a | b | b | b | c | 105 | A |

6 Hot Water Resistance

A lens was dipped in hot water of 80° C. for 2 hours, taken out from the hot water and cooled by water. The adherence test was conducted on the lens. The adherence test was conducted by the same method and the same evaluation criteria as the test for (4) initial adhesion. Lenses employed in this hot water resistance test were tinted lenses that had been prepared by tinting plastic lenses (refer to the tinting method in "Moisture Resistance").

7 Light Resistance

A lens was irradiated by Xenon Long Life Weather Meter (manufactured by SUGA test instrument Co., Ltd.) for 200 hours, taken out from the Xenon Long Life Weather Meter and cooled by water. The adherence test was conducted on the lens. The adherence test was conducted by the same method and the same evaluation criteria as those of the initial adhesion. Lenses employed in this light resistance test were tinted lenses that had been prepared by tinting plastic lenses (refer to the tinting method in "Moisture Resistance").

8 Alkali Resistance Test

A lens was dipped in 10 mass % of aqueous sodium hydroxide (20° C.) for 1 hour, taken out from the aqueous sodium hydroxide and rinsed with water. The adherence test was conducted. The adherence test was conducted by the same method and the same evaluation criteria as those of the initial adhesion.

9 Thermal Resistance

A lens was machined and cut into a shape of a glass frame. The lens was then fit in the lens frame, screwed up and tightened completely, and placed in a constant temperature As seen from the results in Table 1, the lenses of Examples 1 to 4 each having the primer layer between the lens base and the hard coat layer had excellent durability (adherence). In Examples 2 and 4, since the polyester resin and the fine metal oxide particles with the outer most surface thereof treated with the organosilicon compound having the epoxy group were used in combination as the primer composition, especially the moisture resistance and the hot water resistance were enhanced. In Examples 3 and 4, since the fine metal oxide particles containing the titanium oxide of the rutile type crystalline structure was used, the light resistance was particularly enhanced.

On the other hand, in Comparison 1, since the primer layer was not formed, the light resistance and the impact resistance of the lens were not sufficient, and the scratch resistance thereof was slightly inferior to the others. In Comparison 2, since the fine metal oxide particles having the anatase type crystalline structure was used in the hard coat composition, the light resistance was not sufficient. In Comparison 3, since an inorganic multilayer film was formed by vapor deposition as the antireflection film, the thermal resistance was not sufficient. In Comparison 4, since the antireflection film contains high content of inorganic component, the thermal resistance and the alkali resistance were degraded.

INDUSTRIAL APPLICABILITY

The invention can be applied to any plastic lens without limitation. As optical components, there may be exemplified optical lenses such as an eyeglass lens, a camera lens, a telescope lens, a microscope lens and a condenser lens for a stepper.

The invention claimed is:

1. A plastic lens, comprising:
   a plastic lens base material;
   a primer layer formed on the plastic lens base material;
   a hard coat layer formed on the primer layer; and
   an organic antireflection film formed on the hard coat layer, wherein
   the plastic lens base material contains at least a sulfur atom,
   the hard coat layer is a coating film formed of a coating composition containing at least Component A and Component B below,
   the organic antireflection film is a coating film formed of a coating composition containing at least Component C, Component D and Component E, a refractive index of the antireflection film being lower than that of the hard coat layer by 0.10 or more,
   Component A to Component E being as follows:
   Component A: fine metal oxide particles containing a titanium oxide with a rutile type crystalline structure;
   Component B: an organosilicon compound represented by a general formula of $R^1SiX^1{}_3$, wherein $R^1$ represents an organic group with carbon number of 2 or more and having a polymerizable reactive group; and $X^1$ represents a hydrolyzable group;
   Component C: an organosilicon compound represented by a general formula of $X_mR^2{}_{3-m}Si-Y-SiR^2{}_{3-m}X_m$, wherein $R^2$ represents a monovalent hydrocarbon group with carbon number of 1 to 6; Y represents a divalent organic group containing one or more fluorine atom; X represents a hydrolyzable group; and m represents an integer of 1 to 3;
   Component D: an epoxy group-containing organic compound containing one or more epoxy group in a molecule, Component D containing at least one type selected from the group consisting of: a compound represented by a general formula of $R^3{}_nR^4{}_pSiZ_{4-[n+p]}$, wherein $R^3$ and $R^4$ each represent an organic group with carbon number of 1 to 16, at least one of $R^3$ and $R^4$ containing an epoxy group; Z represents a hydrolyzable group; and n and p each represent an integer of 0 to 2, an equation $1 \leq n+p \leq 3$ being satisfied; and a compound represented by a general formula (1) below:

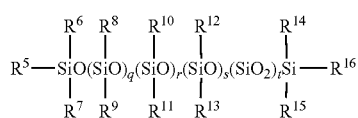

(1)

wherein, $R^5$ to $R^{16}$ each represent an organic group, at least one of $R^5$ to $R^{16}$ containing an epoxy group; and q, r, s and t each represent an integer of 0 to 12; and
   Component E: fine silica particles with average particle size of 1 to 150 nm.

2. The plastic lens according to claim 1, wherein
   the primer layer is a coating film formed of a coating composition containing Component F and Component G below:
   Component F: an organic resin polymer having a polar group; and
   Component G: fine metal oxide particles containing a titanium oxide.

3. The plastic lens according to claim 2, wherein Component F is a polyester resin.

4. The plastic lens according to claim 2, wherein the primer layer contains fine metal oxide particles that are obtained by modifying surfaces of Component G with an organosilicon compound having an epoxy group.

5. The plastic lens according to claim 1, wherein the plastic lens base material contains a thiourethane resin and/or an episulfide resin.

6. The plastic lens according to claim 1, wherein
   a stainproof layer is formed on an upper surface of the antireflection film.

7. A manufacturing method of a plastic lens, comprising:
   polymerizing a polymerized composition containing a monomer having a sulfur atom in a molecule by cast-polymerization to obtain a plastic lens base material;
   forming a primer layer on the plastic lens base material;
   forming a hard coat layer on the primer layer using a coating composition containing at least Component A and Component B below; and
   forming an organic antireflection film on the hard coat layer using a coating composition containing at least Component C, Component D and Component E below, a refractive index of the antireflection film being lower than that of the hard coat layer by 0.10 or more, Component A to Component E being as follows:
   Component A: fine metal oxide particles containing a titanium oxide with a rutile type crystalline structure;
   Component B: an organosilicon compound represented by a general formula of $R^1SiX^1{}_3$, wherein $R^1$ represents an organic group with carbon number of 2 or more and having a polymerizable reactive group; and $X^1$ represents a hydrolyzable group;
   Component C: an organosilicon compound represented by a general formula of $X_mR^2{}_{3-m}Si-Y-SiR^2{}_{3-m}X_m$, wherein $R^2$ represents a monovalent hydrocarbon group with carbon number of 1 to 6; Y represents a divalent organic group containing one or more fluorine atom; X represents a hydrolyzable group; and m represents an integer of 1 to 3;
   Component D: an epoxy group-containing organic compound containing one or more epoxy group in a molecule, Component D containing at least one type selected from the group consisting of: a compound represented by a general formula of $R^3{}_nR^4{}_pSiZ_{4-[n+p]}$, wherein $R^3$ and $R^4$ each represent an organic group with carbon number of 1 to 16, at least one of $R^3$ and $R^4$ containing an epoxy group; Z represents a hydrolyzable group; and n and p each represent an integer of 0 to 2, an equation $1 \leq n+p \leq 3$ being satisfied; and a compound represented by a general formula (1) below:

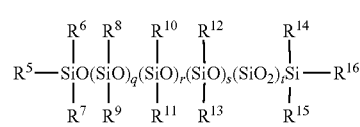

(1)

wherein, $R^5$ to $R^{16}$ each represent an organic group, at least one of $R^5$ to $R^{16}$ containing an epoxy group; and q, r, s and t each represent an integer of 0 to 12; and
   Component E: fine silica particles with an average particle size of 1 to 150 nm.

* * * * *